(12) United States Patent
Hulsing, II

(10) Patent No.: US 6,257,057 B1
(45) Date of Patent: Jul. 10, 2001

(54) EPITAXIAL CORIOLIS RATE SENSOR

(75) Inventor: Rand H. Hulsing, II, Redmond, WA (US)

(73) Assignee: L-3 Communications Corporation, New York, NY (US)

( * ) Notice: Subject to any disclaimer, the term of this patent is extended or adjusted under 35 U.S.C. 154(b) by 0 days.

(21) Appl. No.: 09/324,522

(22) Filed: Jun. 2, 1999

Related U.S. Application Data

(60) Provisional application No. 60/112,451, filed on Dec. 12, 1998.

(51) Int. Cl.[7] .......................................................... G01P 9/04
(52) U.S. Cl. ...................................... 73/504.04; 73/504.12
(58) Field of Search ........................... 73/504.04, 504.12, 73/504.14, 504.16, 510

(56) References Cited

U.S. PATENT DOCUMENTS 5,241,861 * 9/1993 Hulsing, II ........................ 73/504.04

* cited by examiner

Primary Examiner—John E. Chapman
(74) Attorney, Agent, or Firm—Winston & Strawn

(57) ABSTRACT

An apparatus for measuring the specific force and angular rotation rate of a moving body having multiple micromachined force-rebalance accelerometers formed in a layer of epitaxial material. The apparatus further includes a frame formed of the epitaxial material; two accelerometers, flexibly connected to the frame, which are also formed of the epitaxial material and each having a force sensing axis perpendicular to the vibration axis for producing an output signal indicative of the acceleration of the moving body along the force sensing axis; an electrical circuit imparting a dithering motion to the two accelerometers along the vibration axis; and a rate axis perpendicular to the force sensing axes and the vibration axis, whereby the output signals have a Coriolis component indicative of the angular rotation of the moving body about the rate axis.

54 Claims, 10 Drawing Sheets

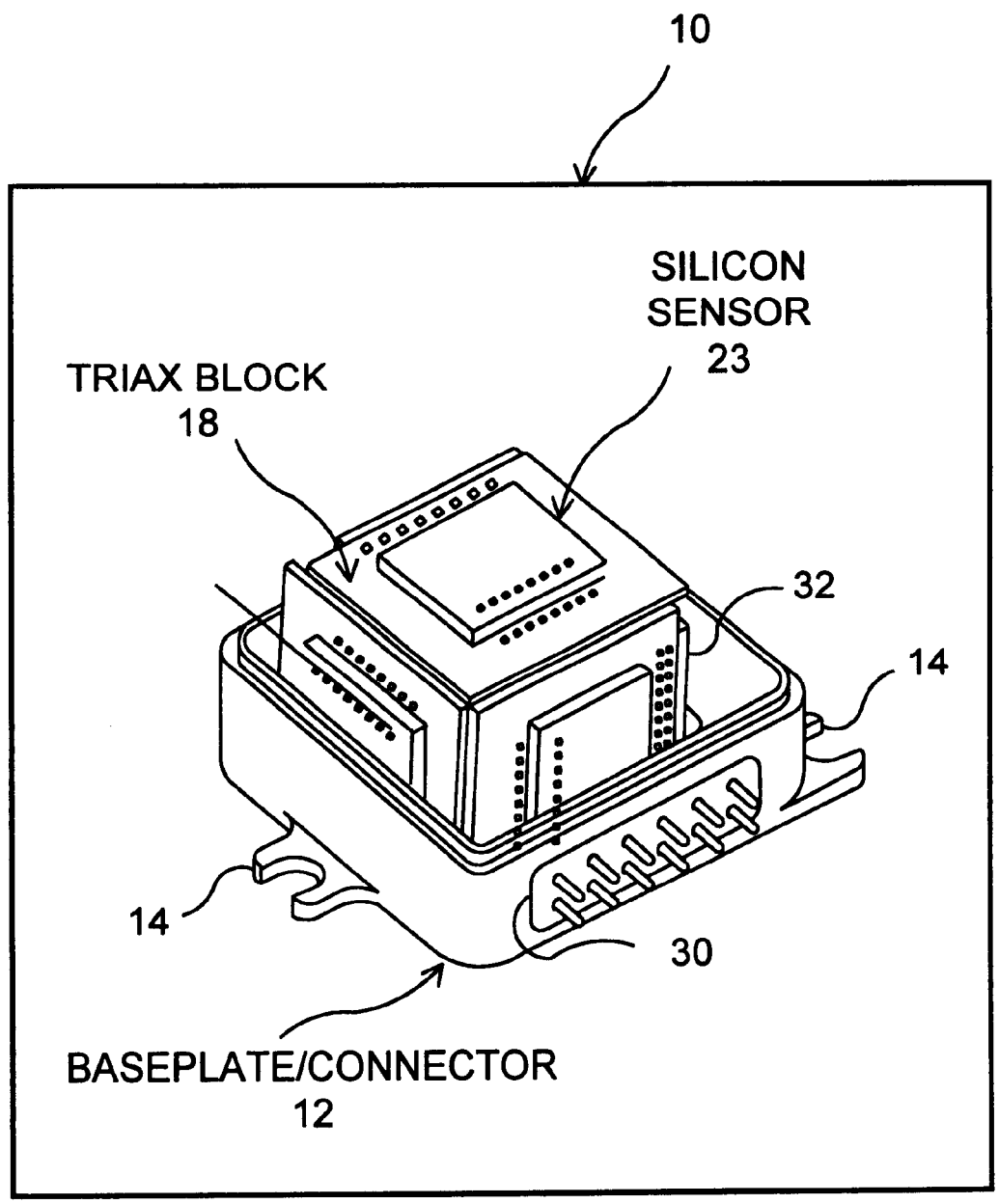
F I G. 1A

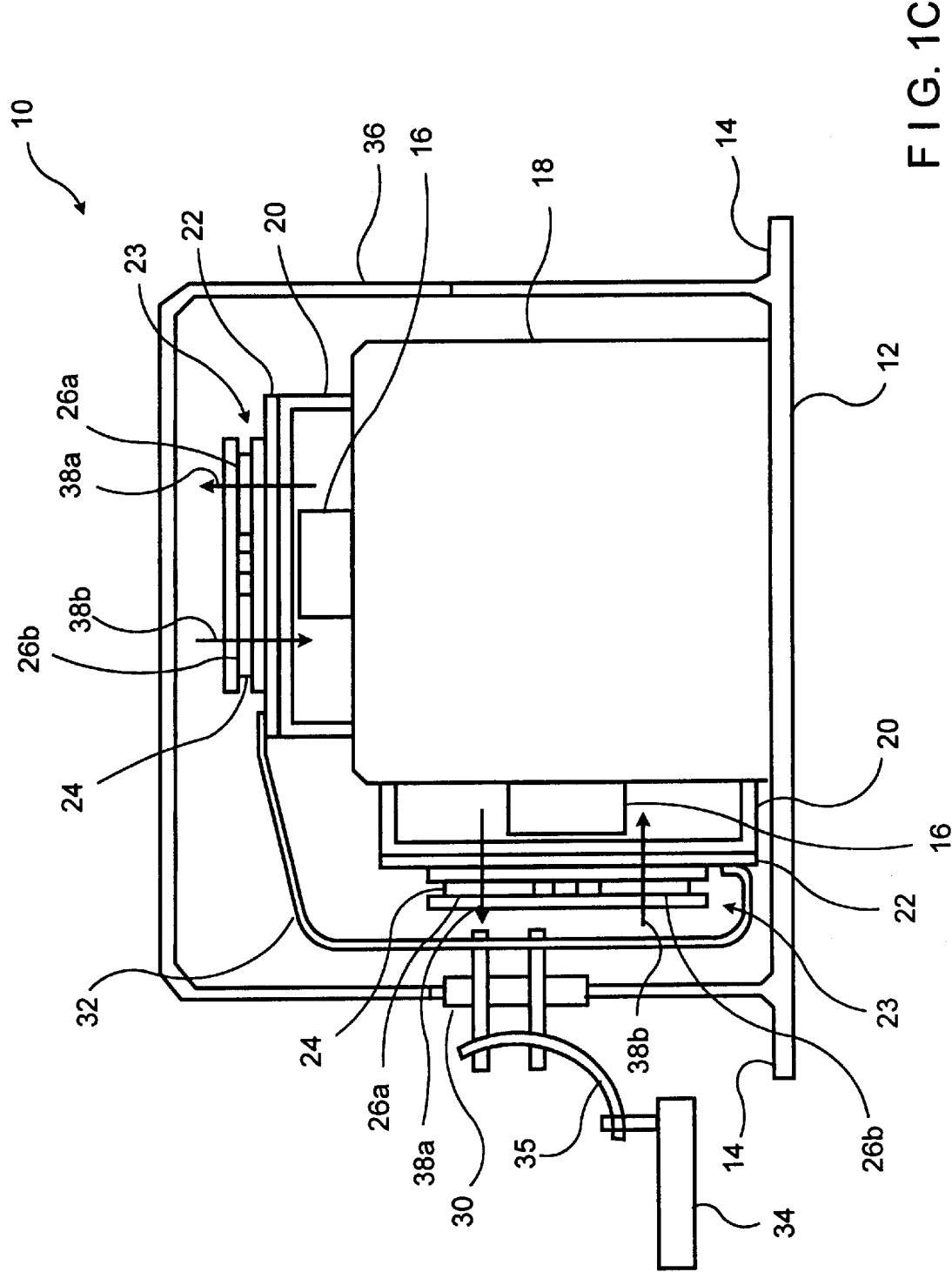

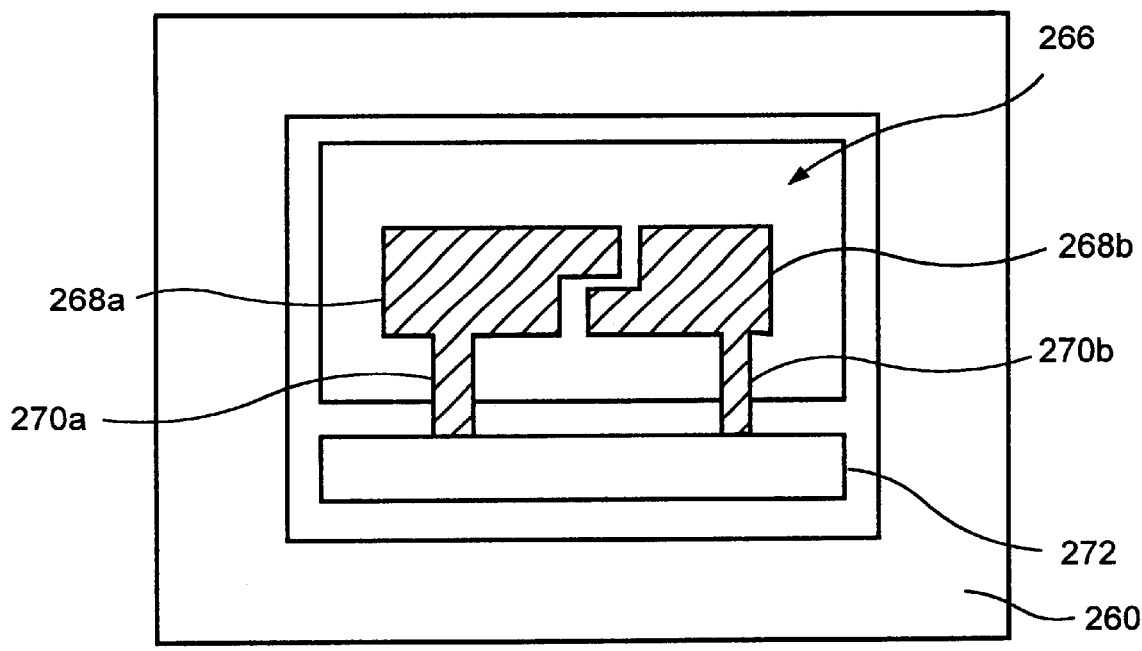
F I G. 2D
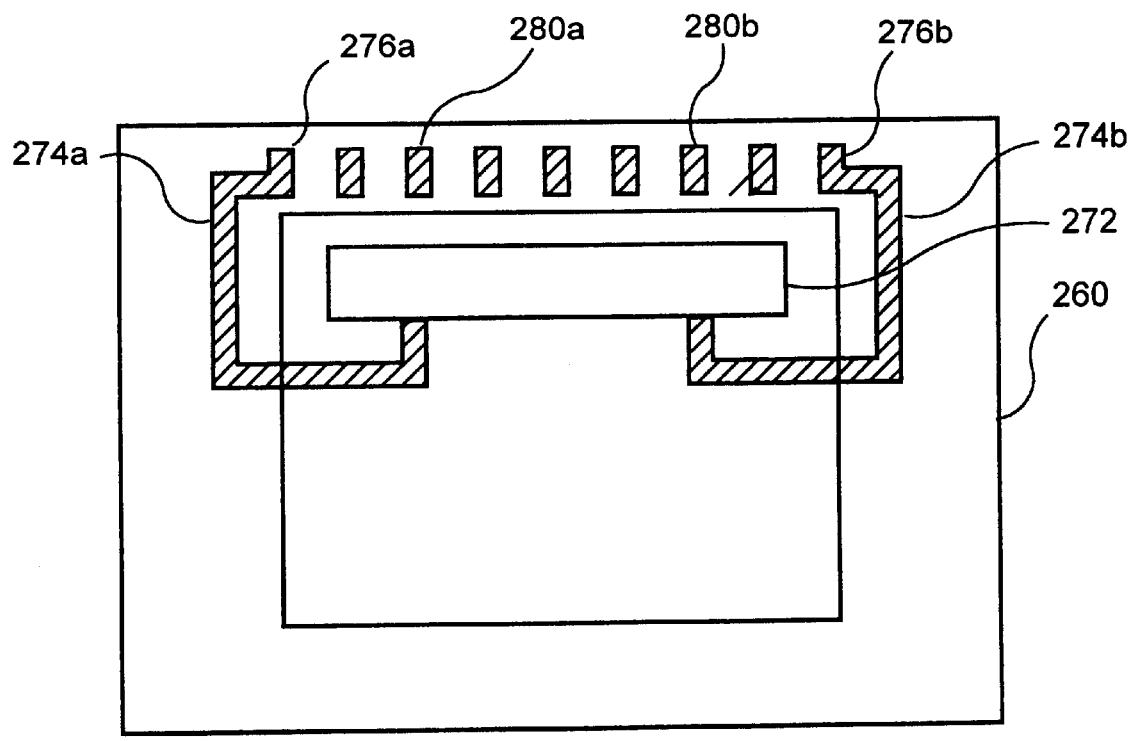
F I G. 2E

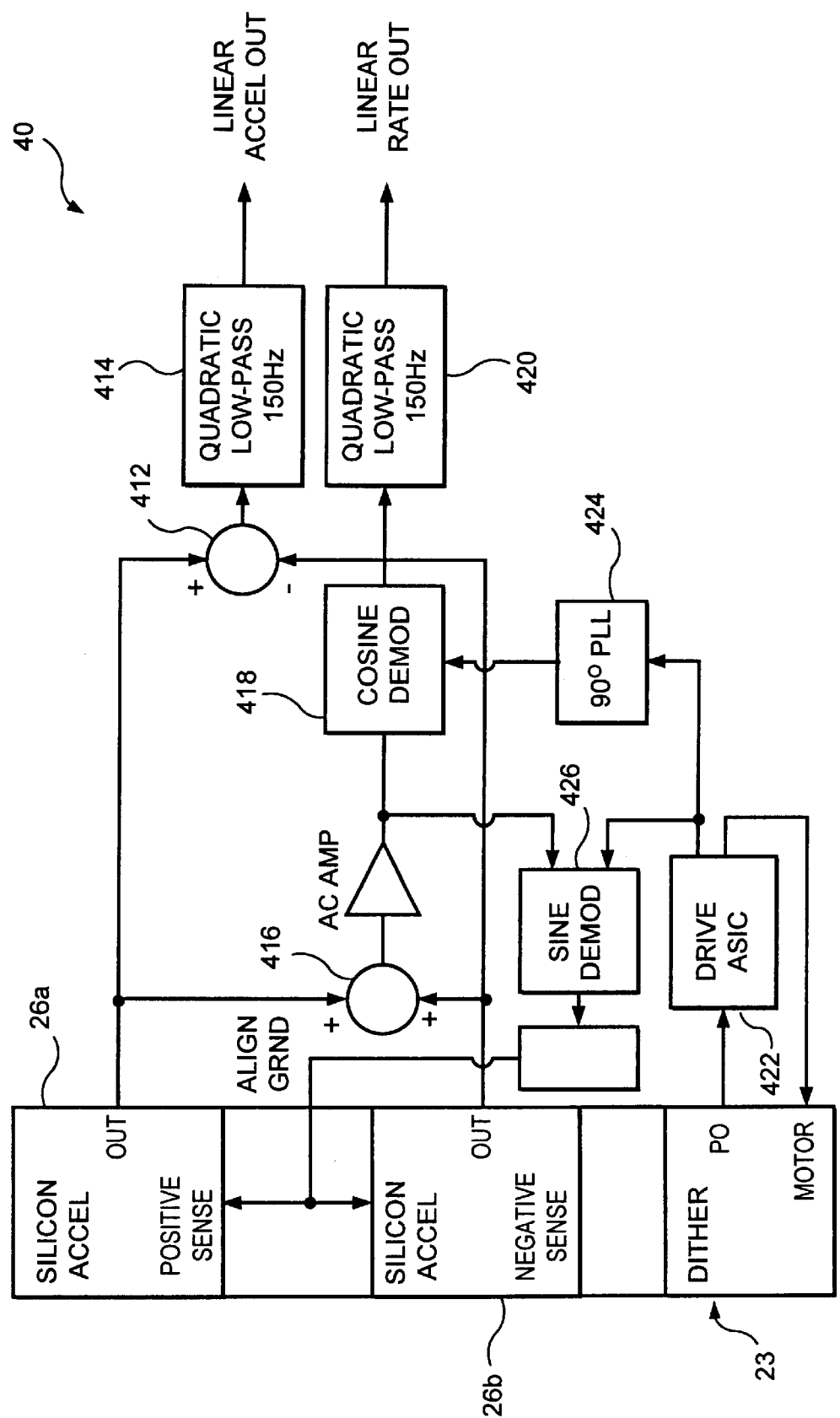
F I G. 4A

EPITAXIAL CORIOLIS RATE SENSOR

This application claims priority from Provisional Patent application Ser. No. 60/112,451 titled "Epitaxial Coriolis Rate Sensor" filed Dec. 12, 1998, the entire specification of which is incorporated herein by reference.

FIELD OF THE INVENTION

The invention relates to an apparatus and method for determining the rate of angular rotation of a moving body and, in particular to the apparatus, adapted to be formed from a silicon substrate.

REFERENCE TO RELATED APPLICATIONS

Reference is made to the following commonly assigned patents:
1) entitled "Control Circuit For Accelerometer," U.S. Pat. No. 4,336,718 issued on Jun. 29, 1982, in the name of John R. Washburn;
2) entitled "Monolithic Accelerometer," U.S. Pat. No. 5,165,279 issued on Nov. 24, 1992, in the name of Brian L. Norling;
3) entitled "Accelerometer With Co-Planar Push-Pull Force Transducers," U.S. Pat. No. 5,005,413 issued on Apr. 9, 1991, in the name of Mitch Novack;
4) entitled "Coriolis Inertial Rate and Acceleration Sensor," U.S. Pat. No. 5,168,756 issued on Dec. 8, 1992, in the name of Rand H. Hulsing II;
5) entitled "Torque Coil Stress Isolator," U.S. Pat. No. 5,111,694 issued on May 12, 1992, in the name of Steven Foote;
6) entitled "Micromachined Rate And Acceleration Sensor," U.S. Pat. No. 5,627,314 issued on May 6, 1997, in the name of Rand H. Hulsing II;
7) entitled "Micromachined Rate And Acceleration Sensor," U.S. Pat. No. 5,557,046 issued on Sep. 17, 1996, in the name of Rand H. Hulsing II;
8) entitled "Micromachined Rate And Acceleration Sensor Having Vibrating Beams," U.S. Pat. No. 5,331,854 issued on Jul. 26, 1994, in the name of Rand H. Hulsing II;
9) entitled "Micromachined Rate And Acceleration Sensor," U.S. Pat. No. 5,241,861 issued on Sep. 7, 1993, in the name of Rand H. Hulsing II;
10) entitled "Capacitance Type Accelerometer For Air Bag System," U.S. Pat. No. 5,350,189 issued on Sep. 27, 1994, in the name of Shiegeki Tsuchitani et al.;
11) entitled "Differential Capacitive Transducer And Method Of Making," U.S. Pat. No. 4,825,335 issued on Apr. 25, 1989, in the name of Leslie B. Wilner;
12) entitled "Miniature Silicon Accelerometer And Method," U.S. Pat. No. 5,205,171 issued on Apr. 27, 1993, in the name of Benedict B. O'Brian et al.;
13) entitled "Low Vibration Link," U.S. application Ser. No. 09/016,186 filed Jan. 30, 1998, and issued on Aug. 8, 2000 as U.S. Pat. No. 6,098,462, in the name of Rand H. Hulsing II; and
14) entitled "Low Vibration Link," U.S. application Ser. No. 09/134,810 filed Aug. 14, 1998, and issued on Jun. 27, 2000 as U.S. Pat. No. 6,079,271, in the name of Rand H. Hulsing II.

BACKGROUND OF THE INVENTION

The rate of rotation of a moving body about an axis may be determined by mounting an accelerometer on a frame and dithering it, with the accelerometer's sensitive axis and the direction of motion of the frame both normal to the rate axis about which rotation is to be measured. For example, consider a set of orthogonal axes X, Y and Z oriented with respect to the moving body. Periodic movement of the accelerometer along the Y axis of the moving body with its sensitive axis aligned with the Z axis results in the accelerometer experiencing a Coriolis acceleration directed along the Z axis as the moving body rotates about the X axis. A Coriolis acceleration is that perpendicular acceleration developed while the body is moving in a straight line, while the frame on which it is mounted rotates. This acceleration acting on the accelerometer is proportional to the velocity of the moving sensor body along the Y axis and its angular rate of rotation about the X axis. An output signal from the accelerometer thus includes a DC or slowly changing component or force signal F representing the linear acceleration of the body along the Z axis, and a periodic component or rotational signal $\Omega$ representing the Coriolis acceleration resulting from rotation of the body about the X axis.

The amplitude of that Coriolis component can be produced by vibrating the accelerometer, causing it to dither back and forth along a line perpendicular to the input axis of the accelerometer. Then, if the frame on which the accelerometer is mounted is rotating, the Coriolis acceleration component of the accelerometer's output signal will be increased proportionally to the dither velocity. If the dither amplitude and frequency are held constant, then the Coriolis acceleration is proportional to the rotation rate of the frame.

The linear acceleration component and the rotational component representing the Coriolis acceleration may be readily separated by using two accelerometers mounted in back-to-back relationship to each other and processing their output signals by sum and difference techniques. In U.S. Pat. No. 4,510,802, assigned to the assignee of this invention, two accelerometers are mounted upon a parallelogram with their input axes pointing in opposite directions. An electromagnetic D'Arsonval coil is mounted on one side of the parallelogram structure and is energized with a periodically varying current to vibrate the accelerometers back and forth in a direction substantially normal to their sensitive or input axis. The coil causes the parallelogram structure to vibrate, dithering the accelerometers back and forth. By taking the difference between the two accelerometer outputs, the linear components of acceleration are summed. By taking the sum of the two outputs, the linear components cancel and only the Coriolis or rotational components remain.

U.S. Pat. No. 4,509,801, commonly assigned to the assignee of this invention, describes the processing of the output signals of two accelerometers mounted for periodic, dithering motion to obtain the rotational rate signal $\Omega$ and the force or acceleration signal F representing the change in velocity, i.e. acceleration of the moving body, along the Z axis. U.S. Pat. No. 4,510,802, commonly assigned to the assignee of this invention, describes a control pulse generator, which generates and applies a sinusoidal signal of a frequency $\omega$ to the D'Arsonval coil to vibrate the parallelogram structure and thus the first and second accelerometer structures mounted thereon, with a dithering motion of the same frequency $\omega$. The accelerometer output signals are applied to a processing circuit, which sums the accelerometer output signals to reinforce the linear components indicative of acceleration. The linear components are integrated over the time period T of the frequency $\omega$ corresponding to the dither frequency to provide the force signal F, which represents the change in velocity, i.e. acceleration, along the Z axis. The accelerometer output signals are also summed, whereby their linear components cancel and their Coriolis components are reinforced to provide a signal indicative of frame rotation. That difference signal is multiplied by a zero mean periodic function sync ωt. The resulting signal is integrated over a period T of the frequency ω by a sample and hold circuit to provide the signal Ω representing the rate of rotation of the frame.

The D'Arsonval coil is driven by a sinusoidal signal of the same frequency ω which corresponded to the period T in which the linear acceleration and Coriolis component signals were integrated. In particular, the pulse generator applies a series of pulses at the frequency ω to a sine wave generator, which produces the substantially sinusoidal voltage signal to be applied to the D'Arsonval coil. A pair of pick-off coils produce a feedback signal indicative of the motion imparted to the accelerometers. That feedback signal is summed with the input sinusoidal voltage by a summing junction, whose output is applied to a high gain amplifier. The output of that amplifier in turn is applied to the D'Arsonval type drive coil. The torque output of the D'Arsonval coil interacts with the dynamics of the parallelogram structure to produce the vibrating or dither motion. In accordance with well known servo theory, the gain of the amplifier is set high so that the voltage applied to the summing junction and the feedback voltage are forced to be substantially equal and the motion of the mechanism will substantially follow the drive voltage applied to the summing junction.

U.S. Pat. No. 4,881,408 describes the use of vibrating beam force transducers in accelerometers. In U.S. Pat. No. 4,372,173, the force transducer takes the form of a double-ended tuning fork fabricated from crystalline quartz. The transducer comprises a pair of side-by-side beams which are connected to common mounting structures at their ends. Electrodes are deposited on the beams and a drive circuit applies a periodic voltage signal to the electrodes causing the beams to vibrate toward and away from one another, 180 degrees out of phase. In effect, the drive circuit and beams form an oscillator with the beams playing the role of a frequency controlled crystal, i.e., the mechanical resonance of the beams controls the oscillation frequency. The vibrating beams are made of crystalline quartz, which has piezoelectric properties. Application of periodic drive voltages to such beams cause them to vibrate toward and away from one another, 180 degrees out of phase. When the beams are subjected to accelerating forces, the frequency of the mechanical resonance of the beams changes, which results in a corresponding change in the frequency of the drive signal. When subjected to acceleration forces that cause the beams to be placed in tension, the resonance frequency of the beams and thus the frequency of the drive signal increases. Conversely, if the beams are placed in a compression by the acceleration forces, the resonance frequency of the beams and the frequency of the drive signal is decreased.

Above referenced U.S. Pat. No. 5,005,413 describes accelerometers using vibrating force transducers that use materials with low internal damping, to achieve high Q values that result in low drive power, low self-heating and insensitivity to electronic component variations. Transducer materials for high-accuracy instruments also require extreme mechanical stability over extended cycles at high stress levels. Crystalline silicon possesses high Q values, and with the advent of low cost, micromachined mechanical structures fabricated from crystalline silicon, it is practical and desirable to create vibrating beams from a silicon substrate. Commonly assigned U.S. Pat. No. 4,912,990 describes a vibrating beam structure fabricated from crystalline silicon and including an electric circuit for applying a drive signal or current along a current path that extends in a first direction along a first beam and in a second, opposite direction along a second beam parallel to the first. A magnetic field is generated that intersects substantially perpendicular the conductive path, whereby the first and second beams are caused to vibrate towards and away from one another, 180 degrees out of phase.

Digital techniques employ stable, high frequency crystal clocks to measure a frequency change as an indication of acceleration forces applied to such vibrating beam accelerometers. To ensure precise integration or cosine demodulation, a crystal clock is used to set precisely the frequency of the dither drive signal. Outputs from two accelerometers are fed into counters to be compared to a reference clock signal produced by the crystal clock. A microprocessor reads the counters and processes the data to provide a force signal F and a rotational signal Ω. The main advantage of digital processing is the ability to demodulate with extreme precision. The short term stability of the reference crystal clock allows the half-cycle time basis to be precisely equal. Thus a constant input to the cosine demodulator is chopped up into equal, positive half-cycle and negative half cycle values, whose sum is exactly zero.

In an illustrative embodiment, the two accelerometer signals are counted in their respective counters over 100 Hz period, which corresponds to a 100 Hz of the dither frequency ω, and are sampled at a 400 Hz data rate corresponding to each quarter-cycle of the dither motion. The two accumulated counts are subtracted to form the force signal F. Since the counters act as an integrator, the acceleration signal is changed directly to a velocity signal. Taking the difference of the acceleration signals tends to reject all Coriolis signals as does the counter integration and locked period data sampling.

The Coriolis signals are detected by a cosine demodulation. The cosine demodulated signals from the first and second accelerometers are summed to produce the Δθ signal. Again, the counters integrate the rate data to produce an angle change. The sum also eliminates any linear acceleration and the demodulation cancels any bias source including bias operating frequency and accelerometer bias. The accelerometer temperature is used in a polynomial model to provide compensation for all the coefficients used to convert the frequency counts into output units. Thus, the scale factor, bias and misalignment of the sensor axes are corrected over the entire temperature range.

The demodulation of the frequency sample is straightforward once the data is gathered each quarter-cycle. The cosine demodulation is simply the difference between the appropriate half-cycles. The linear acceleration is the sum of all samples.

Various issues with the use of vibrating beam force transducers in accelerometers include the need to operate the device in a substantial vacuum such that the beams can vibrate at their natural frequency without loss of energy from viscous damping. Also, the vibrating beams of the first and second accelerometers are formed in first and second layers of epitaxial material formed on opposing sides of the silicon substrate so that the force sensing axis of each accelerometer is directed opposite to the direction of the other. In other words, the vibrating beams must be on opposing sides of the substrate so that one will be in compression and the other in tension when subjected to an applied acceleration force. The high doping levels in the epitaxial layer required to form the vibrating beams make the material inherently unstable.

Thus, the output of the vibrating beams tends to degrade over time and with exposure to thermal environments. The nature of vibrating beam transducers causes accelerometer design and analysis to be relatively complex as compared to that of simpler force rebalance accelerometers and their larger size reduces the quantity of accelerometers which can be fabricated in a single wafer of silicon substrate so that vibrating beam accelerometers are inherently more expensive to produce than miniature force rebalance accelerometers.

Miniature silicon force-rebalance accelerometers in an integrated circuit form are small and inexpensive and generally have a large dynamic range and are operable in high vibration environments over a wide temperature range. Miniature silicon force-rebalance accelerometers having a silicon proof mass suspended between a pair of electrode layers and responsive to differential capacitive coupling between the electrode layers and the proof mass for opposing acceleration forces applied to the proof mass are described in above incorporated U.S. Pat. No. 4,336,718. The miniature silicon force-rebalance accelerometer of the prior art includes a proof mass and two flexures integrally formed from a silicon substrate. The flexure preferably defines a bend line along the mid-plane of the proof mass which is intended to minimize vibration rectification. The silicon substrate including the proof mass is anodically bonded between upper and lower glass substrates having upper and lower metal, for example, gold, electrodes deposited thereon. The upper and lower substrates are preferably formed identically. Symmetry between opposing surfaces of the proof mass and between opposing the electrodes deposited on the upper and lower glass substrates surfaces minimizes bias and maximizes dynamic range and linearity.

The accelerometer balances applied acceleration forces by applying electrical restoring forces to the proof mass through the electrodes of the upper and lower substrates. Parallel AC and DC signals are applied to the proof mass. Capacitances formed between the electrodes on each of the upper and lower substrates and the proof mass are coupled to a differential bridge circuit. The output of the differential bridge filter is used to drive the electrodes of the upper and lower substrates. An acceleration output of the differential bridge filter is applied to the electrodes of the upper and lower substrates to apply electrostatic restoring forces to the proof mass thereby balancing the applied acceleration forces. The magnitude of the restoring force required to restore the proof mass to a neutral position between the opposing upper and lower substrates is a function of the applied acceleration force and is measured to determine the acceleration field.

The miniature silicon force-rebalance accelerometer of the prior art also include additional electrodes on the upper and lower substrates which are substantially thicker than the electrodes through which the electrical restoring forces are applied to the proof mass. These so called "guard band" electrodes cause the proof mass to stand-off from the upper and lower electrodes when the accelerometer is not in servo. The upper and lower guard band electrodes are held at the same potential as the proof mass. The gaps on the upper and lower substrates between the restoring electrodes and the guard electrodes is necessarily small such that the potential difference between the restoring and guard band electrodes causes current leakage across the gap and the substrate material therebetween becomes charged. The potential in the gaps acts as an extension of the potential of the upper and lower restoring electrodes which is indistinguishable from the applied restoring force and, thus, negatively impacts performance. The prior art device attempts to partially mitigate this impact on performance by minimizing the size of the guard electrodes relative the upper and lower restoring electrodes and cutting a groove in the proof mass surface opposite the gaps so that the influence of the potential in the gaps is less significant. Alternatively, the upper and lower substrates, particularly in the gaps between the restoring electrodes and the guard electrodes, are coated with a thin, slightly conductive material to quickly establish and hold essentially constant the potential distribution in the gap.

Outer surfaces of the upper and lower substrates opposite the restoring and guard band electrodes are metalized and grounded shield the transducer from outside electrical fields. Metallic bond pads are formed on the surface of the proof mass and wire bonds provide electrical contacts with the sensor circuitry in one of several manners common to the integrated circuit industry. During operation, an applied acceleration causes relative motion between the proof mass and the upper and lower electrodes as the proof mass attempts to pivot about the two suspension flexures. An imbalance in capacitances between the proof mass and the upper and lower electrodes results which the sensor circuitry balances by applying an electromotive force to the proof mass through the restoring electrodes to move the proof mass to a neutral position between the upper and lower electrodes and hold it there. For example, as the proof mass moves and approaches one of the electrodes and recedes from the other, an increased capacitive pickup of the AC signal causes the differential bridge circuit to apply an increased DC signal voltage to the approaching electrode and to decrease the signal voltage applied to the receding electrode which serves to apply an electrostatic force to the proof mass to resist the force of acceleration and restore the proof mass to a neutral position.

The state of the art in micromachined rate and acceleration sensors is represented by U.S. Pat. No. 5,341,682 which is commonly assigned to the assignee of the present invention and incorporated herein by reference. The rate of rotation of a moving body about an axis may be determined by mounting an accelerometer on a frame and dithering it, with the accelerometer's sensitive axis and the direction of motion of the frame both normal to the rate axis about which rotation is to be measured. A Coriolis acceleration is the measure of the acceleration developed while the body is moving in a straight line and the frame upon which it is mounted rotates about the rate axis. The amplitude of the Coriolis component can be produced by vibrating or dithering the accelerometer, causing it to dither back and forth along a line perpendicular to the input axis of the accelerometer. When the frame upon which the accelerometer is mounted is rotated, the Coriolis acceleration component of the accelerometer's output signal increases in proportion to the dither velocity.

The linear acceleration component and the rotational component representing the Coriolis acceleration may be readily separated by using two accelerometers mounted in back-to-back relationship to each other and processing their output signals by sum and difference techniques as described in U.S. Pat. No. 4,590,801, which is commonly assigned to the assignee of the present invention and incorporated herein by reference.

Rate and acceleration sensors, for example, U.S. Pat. No. 5,341,682, are comprised of two accelerometers aligned in a single plane such that the input or sensitive axes of the two accelerometers are parallel and the output or hinge axes of the two accelerometers are parallel. The two accelerometers are vibrated or dithered at a predetermined frequency along a dither axis parallel to the hinge axes. The two accelerometers tend to vibrate at slightly different frequencies due to slight mass mismatch. Even if driven by a drive signal of common frequency, the accelerometer motions tend to be out of phase with each other. A link is connected to each of the two accelerometers whereby motion imparted to one accelerometer results in like but opposite motion imparted to the other accelerometer. Thus, the dithering motion imparted to one accelerometer is ideally of the exact same frequency and precisely 180 degrees out of phase with that applied to the other accelerometer.

The link provides an interconnect between the two accelerometers which is stiff in the dither axis such that the motion imparted to one accelerometer is effectively transmitted to the other accelerometer and both accelerometers ideally dither at the same frequency and precisely 180 degrees out of phase. The link is pivotally fixed to the frame by a pivot flexure. The link is further connected to each of the two accelerometers by flexures. The link is formed in a complex asymmetric shape. The complexity of the link is driven by practical considerations involved in adapting the link to accommodate both the pivot flexure and the two link-to-accelerometer flexures. The link's complex asymmetric shape provides adequate clearance between the link and the frame for the pivot flexure. The link's shape also provides adequate clearance between the link and each accelerometer to provide the precise flexure length to ensure that the flexures exhibit a predetermined mix of simple arc bending and "S-bend" motion and to ensure that any motion imparted to one accelerometer by the flexures is imparted to the other accelerometer as a sinusoidal function without introducing a higher order harmonic into the translation motion.

Although the complex asymmetric link described in U.S. Pat. No. 5,341,682 functions for the purposes intended, its exact behavior is difficult to predict and/or model analytically. For example, the complex shape of the link results in spring rates which are asymmetrical and a shape which is difficult to solve analytically. Additionally, constructing the shape previously taught results in flexures whose thicknesses and hence vibration properties are difficult to control. Therefore, later patent applications, for example, above incorporated U.S. application Ser. No. 09/016,186 and similarly incorporated U.S. application Ser. No. 09/134,810, provide links having simple geometric shapes formed symmetrically about the pivot point. The behavior of these simpler symmetric links is more easily predicted and/or modeled analytically. For example, these simpler symmetric links result in spring rates which are symmetrical and easier to solve analytically using conventional methods. Additionally, constructing the simpler symmetric shape results in flexures whose thicknesses and hence vibration properties are more easily controlled.

SUMMARY OF THE INVENTION

The present invention provides a specific force and angular rotation rate which overcomes the limitations of the prior art by providing a device using miniature force rebalance accelerometers formed in a single sided epitaxial layer.

According to one aspect of the present invention, the present invention provides an apparatus for measuring the specific force and angular rotation of a moving body formed of a layer of epitaxial material having substantially planar surfaces disposed substantially parallel to each other; a frame formed of the epitaxial material with a vibration axis disposed substantially parallel to the surfaces of the epitaxial material; two accelerometers also formed of the epitaxial material and each having a force sensing axis perpendicular to the vibration axis for producing an output signal indicative of the acceleration of the moving body along the force sensing axis, the accelerometers flexibly connected to the frame such that they can be moved along each of the vibration axis and their respective force sensing axis; an electrical circuit imparting a dithering motion to the two accelerometers of a predetermined frequency along the vibration axis; and a rate axis perpendicular to the force sensing axes and the vibration axis, whereby the output signals have a Coriolis component indicative of the angular rotation of the moving body about the rate axis.

According to another aspect of the invention, the measuring apparatus of the invention includes a link connected between the two accelerometers. The link has a pivot point disposed along its length between the connection to the two accelerometers. One or more supports fix pivot point with respect to the frame and permit the link to pivot thereabout such that, when one of the accelerometers is moved, the link imparts a substantially equal and opposite motion to the other accelerometer. According to one aspect of the invention, the link is a simple rectangular shape symmetric about the pivot such that the link is easily designed and its motion easily analyzed. Additionally, mass reducing air passages are formed in the link, whereby the tendency of the motion of the link to couple with the vibration motion of the sensor is overcome.

BRIEF DESCRIPTION OF THE DRAWINGS

FIG. 1A is an isometric view of the rate and acceleration sensor of the invention with the sensor cover removed for clarity;

FIG. 1C is a cut-away side view of the rate and acceleration sensor of the invention;

FIG. 2D shows the exterior of the upper cover plate which is opposite the epitaxial layer when assembled into sensor assembly, including the conduction pattern deposited thereon;

FIG. 2E shows the interior of the upper cover plate which is adjacent the epitaxial layer when assembled into sensor assembly, including the conduction pattern deposited thereon;

FIG. 4A illustrates a central processing unit (CPU) in which the six analog sensor outputs from three sensor assemblies mounted on orthogonal faces of a cubic structure are converted to a digital format.

DETAILED DESCRIPTION OF THE PREFERRED EMBODIMENT(S)

Figure 1B:
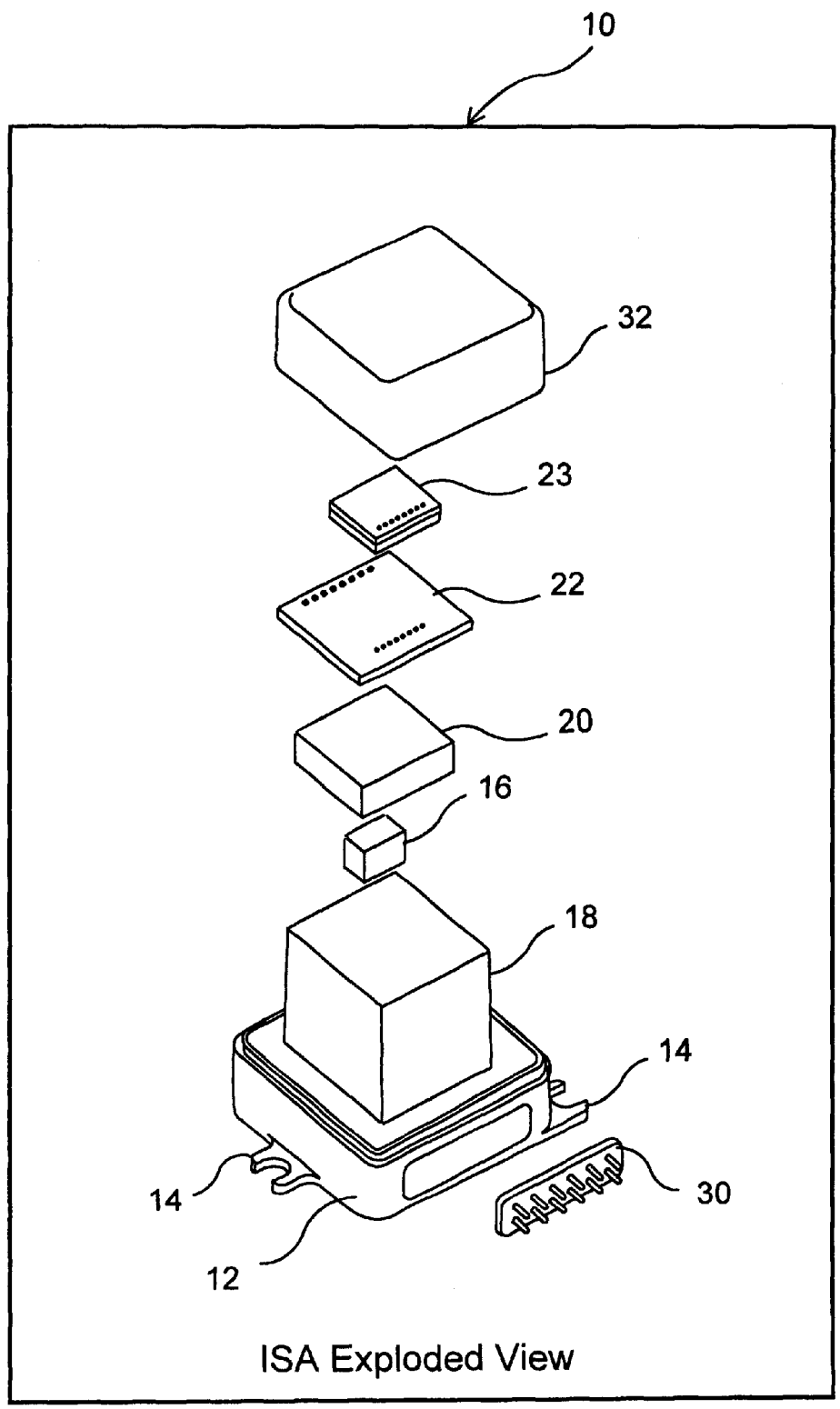
FIG. 1B is an exploded view of the rate and acceleration sensor of the invention.

FIGS. 1A, 1B and 1C illustrate one embodiment of the arrangement of a rate and acceleration sensor 10 according to the present invention. The sensor 10 includes a baseplate 12 including one or more mounting flanges 14. Magnetic flux generators 16 are mounted on the adjacent faces of a cubic return path 18. Magnetic flux generators 16 are, for example, permanent magnets or electromagnets, or suitable another magnetic flux generator of a type known to those of skill in the pertinent art. Cubic return path 18 is securely mounted to baseplate 12 and supports a nonmagnetic sensor mounting structure 20 upon which one or more electronic control board 22 is mounted. Each electronic control board 22 supports a sensor assembly 23 including an epitaxial layer 24 having first and second accelerometers 26a and 26b formed therein such that their respective input axes 38a and 38b are disposed in parallel but opposite directions. Each accelerometer 26a, 26b is electrically interconnected to its respective control board 22 which is in-turn interconnected to a connector 30 by, for example, flex strip 32. Connector 30 is hermetically mounted in a face of baseplate 12 for outputting angular rate and linear acceleration data to a central processing unit (CPU) 34 via another flex strip (not shown). A cover 36 seals in a prescribed atmosphere and protects the sensitive mechanical and electrical components from contamination and damage. The sealed in atmosphere is preferably a standard dry nitrogen/helium mixture, for example, 90° nitrogen/10° helium, at one standard atmosphere pressure. The helium is present to provide a means for measuring the quality of the hermetic seal and is not necessary to the proper functioning of the sensor.

Sensor assembly 23 is preferably isolated in one of several ways to reduce the stresses from a mounting surface which may have a different thermal expansion characteristics and to reduce shock and vibration transmission externally applied to sensor 10. For example, such isolation may take the form of isolation cuts in epitaxial layer 24 (shown in detail in FIG. 2A) surrounding accelerometers 26, the addition of flexible support members extending between epitaxial layer 24 and accelerometers 26, or other isolation techniques known to those of ordinary skill in the pertinent art. Above incorporated U.S. Pat. No. 5,205,171 suggests, for example, that a transducer may be isolated to reduce the transmission of externally applied thermal, vibration and shock stresses by mounting the transducer using an appropriate resilient adhesive material having an admixture of some electrically conductive material such as carbon-black or silver powder.

Figure 2A:
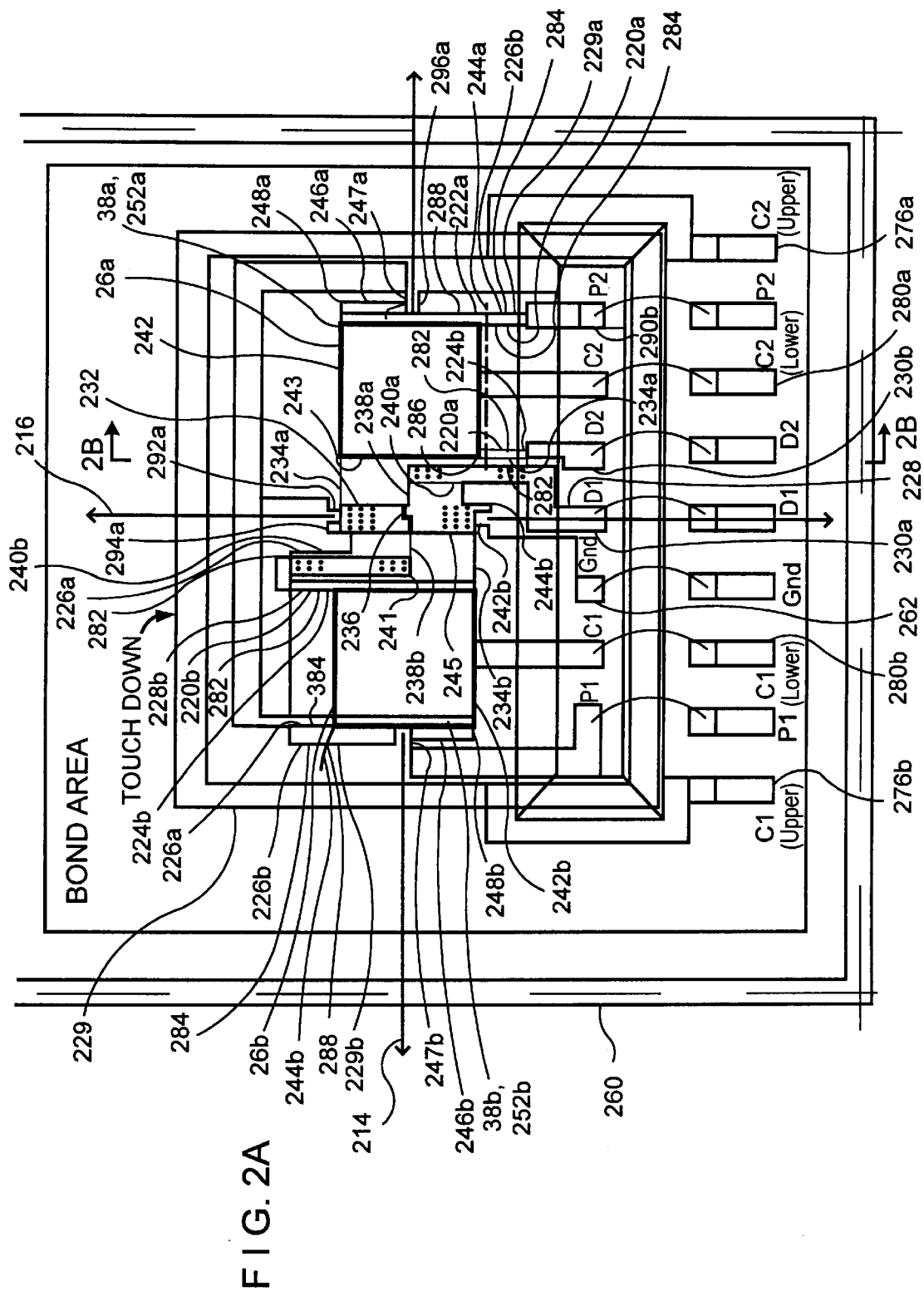
FIG. 2A is a top plan view of the unitary epitaxial layer out of which are formed a pair of accelerometers disposed in a side-by-side relationship with their input axes pointing in opposite directions.

FIG. 2A shows the details of epitaxial layer 24. Epitaxial layer 24 is grown by known methods on one surface of unitary, silicon substrate 39. First and second accelerometers 26a, 26b are micromachined from epitaxial layer 24 and are disposed in side-by-side relation such that their input axes 38a and 38b are disposed in parallel but opposite directions. In FIG. 2A, input axis 38a of accelerometer 26a is disposed out of the page, whereas input axis 38b of accelerometer 26b is disposed into the page. Further, input axes 38a and 38b are disposed perpendicular to a dither or vibration axis 214 and to a rate axis 216. As is well known in the art, accelerometers 26a, 26b will respond to linear acceleration along their input axes 38a, 38b, respectively, and to rotation of epitaxial layer 24 about its rate axis 216.

Epitaxial layer 24 includes a mounting frame 218. Each of accelerometers 26a, 26b is rotationally suspended relative to epitaxial layer 24 by a pair of hinge flexures 220 and 222. Each of hinge flexures 220, 222 is formed from epitaxial layer 24 to the full thickness of epitaxial layer 24. The length of each of hinge flexures 220, 222 is selected to provide a spring rate relative to the mass of accelerometers, e.g., of 0.07 milligram, that will cause hinge flexures 220, 222 to flex in a predominately simple bending motion combined with a component of "S-bend" motion when subjected to an acceleration force applied along input axis 38. For example, according to one preferred embodiment of the invention, the ratio of out-of-plane "S-bend" motion to simple bend motion is 4-to-1.

Hinge flexures 220, 222 do double duty and act as dither flexures for accelerometers 26 in the plane of epitaxial layer 24. Each of hinge/dither flexures 220, 222 are preferably formed of two or more narrow beams 224a, 224b and 226a, 226b, respectively, upon which conductive paths 228 and 229 are deposited. Configuring hinge flexures 220, 222 having multiple narrow beams or "legs" decreases the in-plane stiffness thereby minimizing the force that drives the dither motion. The spring rate of narrow beams or legs 224a, 224b and 226a, 226b of hinge/dither flexures 220, 222 is proportional to $W^3/L^3$ in the plane of epitaxial layer 24, where W is the width of legs 224 and 226 and L is the length thereof. The length L and width W of hinge legs 224 and 226 are set such that when rotational motion is applied in the plane of epitaxial layer 24, legs 224 and 226 then flex in an "S" configuration. Such "S-bend" leg flexures 224 and 226 permit accelerometers 26a, 26b to translate with predominantly linear motion in the plane of epitaxial layer 24, i.e., the plate surfaces of proof masses 242a, 242b of accelerometers 26a, 26b remain substantially parallel to the surfaces of epitaxial layer 24 and to each other as they are translated along their respective input axes 38a, 38b.

Magnet 16 and flux path 18 with case return 36 provide a magnetic path for directing the flux emanating from the magnet 16 through epitaxial layer 24. As will be explained, the configuration and disposition of accelerometers 26a and 26b within epitaxial layer 24 permits a simple, straightforward magnetic flux path to effect the operation of the dithering motion of accelerometers 26a and b. Upon application of a periodic drive signal or current to conductive path 228 via external connectors 230a and 230b, interaction with a magnetic field emanating from magnet 16 substantially perpendicular to the surface of epitaxial layer 24 subjects accelerometers 26a, 26b to a periodic dithering motion along common dither axis 214.

A link 232 is connected to the unsupported, or "free," end of each accelerometer 26 opposite hinge flexures 220, 222 to insure that the dithering motion imparted to one of accelerometers 26a, 26b will be of the same frequency and in phase with that applied to the other of accelerometers 26a, 26b. Without link 232 therebetween, accelerometers 26a, 26b would tend to vibrate at slightly different frequencies due to slight mass mismatch. Even if driven by a drive signal of common frequency, the motions of accelerometers 26a, 26b would tend to be out of phase with each other. Link 232 is connected by a dither flexure 234a to the unsupported moving end of first accelerometer 26a opposite to hinge/dither flexures 220a and 222a, which mount accelerometer 26a to mounting frame 218. Link 232 is similarly connected by a second dither flexure 234b to the unsupported moving end of second accelerometer 26b opposite to hinge/dither flexures 220b and 222b, which mount accelerometer 26b to mounting frame 218. Link 232 resembles a lever pivotally mounted about a pivot point 236. Pivot point 236 is located intermediate between the connection points of first and second dither flexures 234a, 234b to the free ends of accelerometers 26a, 26b, respectively. Link 232 is preferably axes-symmetric about pivot point 236 and, according to one preferred embodiment, is rectangularly shaped. Alternatively, link 232 is any of a complex asymmetric 'U' shape as described in above incorporated U.S. Pat. No. 5,241,861 or a simple 'U' shape symmetric about pivot point 236 as described in each of commonly assigned and previously incorporated U.S. patent application Ser. No. 09/016,186 and U.S. patent application Ser. No. 09/134,810. Link 232 is supported by two pivot flexures 238a and 238b. Pivot flexures 238a, 238b are in turn mounted along a center axis of epitaxial layer 24 by support members 240a and 240b, which are in turn affixed to frame 218. Support members 240a and 240b are preferably formed with a number of air passages 241 for reducing squeeze film damping between each support member 240 and the opposing capacitor plates which would impede the motion of support member 240 along input axis 38. The air passages are, for example, 0.001 inch by 0.001 inch square holes although other sizes and shapes may be equally effective. Alternatively, squeeze film damping may be reduced by forming channels in either or both surfaces of support members 240a and 240b as are known to those of ordinary skill in the pertinent art. Two examples are above incorporated U.S. Pat. No. 5,350,189 and U.S. Pat. No. 4,825,335.

Those of ordinary skill in the art will recognize that proof masses 242a, 242b are subject to motion out of the plane of epitaxial layer 24 along respective input axes 38 in response to linearly applied acceleration forces. Furthermore, those of ordinary skill in the art will recognize that the combination of proof mass 242 with hinge flexures 220, 222 form a mass-spring system that has a natural resonance frequency along respective input axes 38. According to one aspect of the present invention, link 232 is also subject to motion along input axis 38 with accelerometers 26 due to the interconnection with proof masses 242. Each of pivot flexures 238 and support members 240 flex to accommodate such out of plane motion of link 232. Preferably, the mass-spring system formed by the combination of link 232 with pivot flexures 238a, 238b and support members 240a, 240b has a resonant frequency essentially matched to that of the mass-spring system formed by proof mass 242 and hinge flexures 220, 222 such that the motion of the link/flexure system does not couple into that of the proof mass/flexure system. In a preferred embodiment, the motion of link 232 along input axis 38 causes support members 240a, 240b flex out of the plane of epitaxial layer 24 with a simple bending motion while pivot flexures 238a, 238b are torsional flexures twisting about respective longitudinal axes essentially aligned with dither axis 214.

Accelerometers 26a, 26b are analog electrostatic force-rebalance accelerometers as taught, for example, in each of above incorporated U.S. Pat. No. 5,350,189 and U.S. Pat. No. 5,205,171. Analog force-rebalance accelerometers have distinct advantages over the vibrating beam accelerometers used in the rate and acceleration sensors of the prior art as exemplified by commonly assigned and previously incorporated U.S. Pat. No. 5,241,861. One advantage of the analog force-rebalance accelerometers in the rate and acceleration sensor of the present invention is that noise can be filtered with a quadratic low-pass filter at the signal source whereby random walk can be confined to a relatively narrow range on the order of $0.02$ deg/$\sqrt{hour}$ over a relatively wide bandwidth, for example, a 150 Hz bandwidth. Another advantage is that axis alignment using an analog sensor can be implemented by the relatively simple means of summing an off-set voltage to the capacitor pick-off plates. By feeding back a sine demodulated rate channel output, a high bandwidth servo loop can continuously null the major bias error source and compensate for thermal stresses, mechanical packing stresses, initial processing errors and wafer flatness errors. Also, analog force-rebalance accelerometers are typically operated in one atmosphere pressure which reduces sealing integrity requirements to limits readily realizable using conventional sealing methods, such as welding. The magnetic dither drive described herein provides sufficient force to drive the mechanism in one atmosphere ambient pressure.

Each of accelerometers 26a, 26b are electrostatic force-rebalance accelerometers which operate similarly to those taught in each of above incorporated U.S. Pat. No. 5,350,189 and U.S. Pat. No. 5,205,171. However, according to one novel aspect of the invention, the details of accelerometers 26a, 26b of the present invention are formed in epitaxial layer 24. The details of accelerometers 26a, 26b are micromachined in a lightly doped epitaxial layer in contrast to a polysilicon surface micromachined sensor or another surface micromachined sensor using a more heavily doped silicon layer as its sensing element. Polysilicon and other more heavily doped silicon layers tend to bow out-of-plane due to heavy stresses caused by the molecular level dislocations the doping materials introduce. Also, polysilicon and other more heavily doped silicon layers are inherently unstable in the long term because the doping material migrates with time and temperature. Forming the sensor details in the epitaxial layer allows a wide variety of shapes to be rapidly cut using mature conventional processes.

The behavior of the epitaxial layer sensing element is more easily predicted and/or modeled analytically because, analytically, the sensor is simply a two-dimensional figure extruded into a uniform thickness. For example, finite element models of these simpler two-dimensional figures result in computer models which are easier to create and to solve analytically using conventional methods. Furthermore, the models are more nearly exact approximations of the actual silicon shape realized by the reactive ion etch (RIE) process. The silicon mask used in processing the epitaxial layer sensor is much simpler because it is only a single oxide mask without the usual corner compensation for complex three-dimensional shapes. Combined, the above advantages result in a significant reduction in the time required for the design/fabricate/test cycle. For example, the design/fabricate/test cycle is estimated at one-third to one-half the cycle time required for typical bulk machined designs.

Silicon substrate 39 is preferably of standard thickness of 508 micrometers with epitaxial layer 24 formed on a single side with a ground finish. The overall size of the sensor of the invention formed in substrate 39 is roughly 0.33 inch long by 0.28 inch wide after dicing as compared with the prior art mechanism which measures about 0.7 inch by 0.5 inch. The reduced size allows for about eighty sensors of the present invention to be formed in a standard 4.0 inch wafer, an improvement in production capability over the prior art of about 4-to-1. The details of accelerometers 26a and 26b, including frame 218 and link 232, are formed in epitaxial layer 24. Each accelerometer 26 is formed with proof mass 242 which measures about 0.050 inch square and is preferably formed with a large number of air passages 243 for reducing squeeze film damping between each proof mass 242 and its opposing capacitor plate which would impede the motion of proof mass 242 relative to the opposing capacitor plates. Air passages 243 also significantly reduce the mass of proof mass 242 which reduces the sensitivity to shock and vibration input perpendicular to input axis 38 and permits hinge/dither flexures 220, 222 to withstand higher shock loads. Other advantages provided by air passages 243 include the ability to dither the mechanism at higher dither frequencies; use larger damping gaps thereby reducing squeeze film damping; use larger capacitance areas which increases the output signal; and combine the dither and hinge functions into single flexures 220, 222 as described above whereby the designing and manufacturing complexity of the device is greatly reduced. The air passages are, as in the above described example, preferably essentially square holes, although other sizes and shapes may be equally effective. Alternatively, squeeze film damping may be reduced by forming channels in either or both surfaces of proof mass 242 as are known to those of ordinary skill in the pertinent art as described in above incorporated U.S. Pat. No. 5,350,189 and U.S. Pat. No. 4,825,335. Each proof mass 242 is flexibly suspended by pair of hinge flexures 220, 222 to accelerometer frame 218. Hinge flexures 220, 222 define a hinge axis 244 about which proof mass 242 rotates when accelerating forces are applied along input axis 38 of each accelerometer 26, its proof mass 242 tends to pivot about its hinge axis 244. Hinge axes 244a and 244b of accelerometers 26a and 26b, respectively, are aligned essentially parallel with common dither axis 214. The opposite or unsupported end of each proof mass 242 is pliantly or flexibly connected to link 232 by dither flexure 234 and to accelerometer support frame 218 by a second frame flexure 246.

A first foot flexure 247 is disposed at right angles to frame flexure 246 to interconnect one end of frame flexure 246 to an innerperipheral edge of the accelerometer support frame 218. A second foot flexure 248 is disposed at right angles to frame flexure 246 to interconnect the end of frame flexure 246 opposite first flexure foot 247 to proof mass 242. Second foot flexure 248 is connected to an edge of the free end of proof mass 242 remote from its hinge flexures 220 and 222 and its hinge axis 244. Those of ordinary skill in the art will recognize that proof masses 242a, 242b are subject to motion out of the plane of epitaxial layer 24 along respective input axes 38 in response to linearly applied acceleration forces. As described above and in above incorporated U.S. Pat. No. 4,509,801, the rotational component representing the Coriolis acceleration resulting from rotation of the body about rate axis 216 is developed by mounting accelerometers 26a and 26b in a back-to-back relationship to each other. Given such a configuration, proof masses 242a and 242b of accelerometers 26a and 26b, respectively, move separately along their respective input axes 38a and 38b. Link 232 having its extremities attached to the free ends of proof masses 242 causes it to rotate about both dither axis 214 and rate axis 216 to accommodate the opposing motions of proof masses 242a and 242b. The combination of frame flexure 246 with first and second interconnecting foot flexures 247, 248 and dither flexure 234 provide multiple degrees of freedom, whereby link 232 is able to provide such accommodation. Additionally, the flexure spring forces applied at the free end of each proof mass 242 in all three dimensions, as represented by accelerometer input axis 38, dither axis 214 and rate axis 216, are balanced to ensure that each proof mass 242 reacts to an acceleration force applied along its input axis 38 as if its reaction mass was symmetric about its center of gravity. In other words, the spring rates of the flexures at the two edges of the free end of each proof mass 242, are matched so that they apply the same resistance to motion of proof mass 242 in all three axes. In the embodiment of FIG. 2A, the spring rates at the free end of each proof mass 242 in input axis 38 are essentially matched while the spring rates in dither axis 214 are matched to a lesser degree and the spring rates in rate axis 216 are matched to a yet lesser degree. Thus, the lengths of frame flexure 246 with first and second interconnecting foot flexures 247, 248 is calculated such that its combined spring rate is essentially identical to that of dither flexure 234 which provides maximum flexibility while balancing the spring forces exerted on the free end of proof mass 242. Frame flexure 246 and its foot 248 are so configured and dimensioned to provide sufficient flexibility to allow rotation of proof mass 242 about its hinge axis 244, whereby proof mass 242 is free to move along its input axis 38 while dither and frame flexures 234, 246 tend to dampen or attenuate extraneous movements applied to proof masses 242a or 242b.

Accelerometers 26a, 26b are mounted upon opposing sides of accelerometer frame 218 by hinge flexures 220 and 222, each of hinge flexures 220 and 222 being preferably formed as slotted legs having two or more leg members 224, 226 as described in detail above. The free ends of accelerometers 26 are supported by frame flexures 246 with first and second foot members 247 and 248 and tied to link 232 by dither flexures 234. Each of hinge flexures 220 and 222, including leg flexures 224 and 226, frame flexures 246 with first and second foot members 247 and 248, and dither flexures 234 is formed by micromachining using the full thickness of epitaxial layer 24, illustratively of about 20 micrometers.

The length of each of frame flexures 246 is also selected in combination with first and second foot members 247 and 248 to provide a spring rate relative to the mass of accelerometers 26 that will cause each of frame flexures 246 to also flex in an "S-bend" in the plane of dither axis 214 when subjected to the dither motion. The spring rate of frame flexures 246 in dither axis 214 is similarly proportional to $W^3/L^3$, where W is the width of frame flexures 246 in dither axis 214 and L is the length thereof. The length L and width W of frame flexures 246 are also set such that when dither motion is applied, frame flexures 246 then flex in an "S" configuration in dither axis 214. Such "S-bend" frame flexures 246 permit elements of accelerometers 26a and 26b to translate with predominantly linear motion and remain substantially parallel to the plane of epitaxial layer 24 and to each other as they are dithered along the dither axis 214. In addition, frame flexures 246 permit accelerometers 26a and 26b to move in a predominantly linear fashion with only an insignificant nonlinear frequency component imposed thereon.

Link 232 mechanically interconnects first and second accelerometers 26a and 26b so that any motion, including dithering motion and extraneous motions applied to one of first and second accelerometers 26a and 26b, will also be applied in precisely equal and opposite fashion to the other one of first and second accelerometers 26a and 26b. In this fashion, the outputs of accelerometers 26a and 26b may be processed simply by well known sum and difference techniques to provide a force signal F and the rotational signal Ω, as well as to cancel out erroneous signals. Without link 232, accelerometers 26a and 26b would operate at different frequencies due to slight mass mismatch of their respective proof masses 242a and 242b. If driven at a common frequency, accelerometers 26a and 26b would operate out of phase with each other, i.e., other than 180°, without link 232.

The configuration and the manner of mounting link 232 are effected to permit link 232 to effectively pivot about pivot point 236. Pivot point 236 is disposed essentially at the midpoint of link 232 coincident with the centerline of epitaxial layer 24 and dither axis 214. Pivot point 236 is formed by the intersection of link 232 with pivot flexures 238a and 238b. As shown in FIG. 2A, a first end of each pivot flexure 238a, 238b is affixed to one of respective support members 240a, 240b and extends horizontally along dither axis 214. The length of each pivot flexure 238a, 238b is selected, e.g., 10 mils according to the embodiment illustrated in FIG. 2A, to impart the same displacement to link 232 as the displacement of accelerometers 26. In preferred embodiments, the length of pivot flexures 238 selected also imparts a combination of "S-bend" motion and simple bend motion thereto, whereby that portion of each pivot flexure 238a, 238b extending between each of support members 240a, 240b, respectively, and link 232 flexes in a smooth arc at the extremities, where they are joined to link 232 and support member 240, and flexes with an "S-bend" motion therebetween. In this fashion, the end points of link 232 are disposed a radial distance from pivot point 236 equal to the effective radius of rotation provided by the "S-bend" hinge flexures 220 and 222 for the accelerometers 26a and 26b.

As indicated above, link 232 moves along input axis 38 with accelerometers 26 in response to a linear acceleration input and link 232 rotates about dither axis 214 and rate axis 216 in response to a rotational input. The mechanical characteristics of the mass-spring system formed by proof mass 242 and hinge flexures 220, 222 give accelerometers 26 a natural dither resonance frequency along dither axis 214. Preferably, the mass-spring system formed of link 232 with pivot flexures 238 is configured to have a resonant frequency essentially matched to that of the mass-spring system of accelerometers 26 along dither axis 214 such that the dither motion of the link/flexure system does not couple into the accelerometer dither motion. As also discussed above, the length of each of pivot flexures 238a, 238b is designated so that it flexes with a combination of "S-bend" motion and simple bend motion. To accommodate pivot flexures 238a, 238b of the desired length, the spacing between accelerometers 26a and 26b and the configurations of each of link 232 and support members 240a, 240b are selected to provide the preferred spacing between link 232 and support members 240a, 240b. In an alternative configuration, a portion of support member 240 is removed to provide a cut out (not shown) by notching support member 240 at its juncture with pivot flexure 238, whereby the effective length of pivot flexure 238 is set to provide the combined "S-bend" motion and simple bend motion.

As shown in FIG. 2A, opposite ends of dither flexures 234a and 234b are respectively interconnected between an edge of the free end of one of proof masses 242a and 242b and one of the opposite ends of link 232. Dither flexures 234a and 234b are dimensioned and, in particular, their lengths are set such that they exhibit a combination of simple arc bend and "S-bend" motion. In an alternative configuration (not shown), a notch is cut in either or both of link 232 and proof mass 242 at the juncture of with dither flexure 234, whereby the effective length of dither flexures 234a and 234b is determined to ensure that dither flexures 234 have combined characteristics simple motion and "S-bend" motion. Further with such characteristics, any motion imparted by dither flexures 234 to one of accelerometers 26 is assuredly imparted as a sinusoidal function to the other of accelerometers 26 without introducing a higher order odd harmonic into the translation motion. Without such dither flexures 234 and link 232, the dither motion as well as other extraneous motion applied to epitaxial layer 24, could impose high order harmonic motion to accelerometers 26a and 26b, whose outputs upon demodulation would bear an undesired bias signal if their amplitude varies.

Link 232 moves along input axis 38 with accelerometers 26a and 26b in response to a linearly applied acceleration force and, incidentally, increases the reaction mass of accelerometers 26. As such, link 232 also provides a space for squeeze film damping which would impede the motion of proof mass 242 relative to the opposing capacitor plates. Therefore, link 232 also is preferably formed with air passages 245 for reducing such squeeze film damping. The air passages are, as in the above described examples, 0.001 inch by 0.001 inch square holes although again other sizes and shapes may be equally effective. Alternatively, squeeze film damping between link 232 and the opposing capacitor plates may be reduced by forming channels in either or both surfaces of link 232 as are known to those of ordinary skill in the pertinent art as described in each of above incorporated U.S. Pat. No. 5,350,189 and U.S. Pat. No. 4,825,335.

As indicated above, whether hinge flexures are formed of multiple leg flexures 224 and 226 or single hinge flexures 220 and 222, hinge flexures 220 and 222 are formed with such dimensions and, in particular, their length is configured such that they flex with a predominant "S-bend" motion. In particular, one end of each of hinge flexures 220 and 222 is respectively affixed to the inner periphery of accelerometer frame 218 and the other end to proof mass 242. An external edge portion of proof mass 242 is removed to provide a cut out 280 so that the length of each hinge flexure 220a, 220b and 222a, 222b is critically set to provide the desired "S-bend" motion and so that the other end of each hinge flexure 220a, 220b and 222a, 222b are connected to a point along the vertical edges of proof masses 242a and 242b. As shown in FIG. 2A, hinge flexures 220 and 222 support proof masses 242a and 242b so that their centers of gravity 252 and pivot point 236 lie along the central axis of epitaxial layer 24 so that the center axis coincides with dither axis of 214.

"S-bend" hinge flexures 220 and 222, or leg flexures 224 and 226, have respective pivot points 282 and 284, which are disposed a distance ⅙th of the flexure length from the inner periphery of accelerometer frame 218. "S-bend" hinge flexures 220 and 222 form respectively an effective radius from their pivot points 282 and 284 to their points of connection with their proof masses 242. That effective radius is equal to ⅚ of the length of hinge flexures 220 and 222, which in turn precisely equals the radius provided by link 232 from pivot point 236 to the points of interconnection of dither flexures 234a and 234b to the extremities of link 232. By providing link 232 and proof masses 242a and 242b with equal radii of rotation about the respective pivot points 236, and 282 and 284, link 232 is assured to provide equal and opposite motion to proof masses 242a and 242b. As a result, if any extraneous noise is applied to one of proof masses 242a and 242b, a like and opposite motion will be applied to the other one of proof masses 242a and 242b, so that upon processing any noise in the outputs of accelerometers 26a and 26b is effectively removed by sum and difference techniques.

Upon application of the dithering motion, accelerometers 26a and 26b move back and forth in a substantially parallel relationship to each other due to the "S-bend" flexing of their hinge flexures 220 and 222 or leg flexures 224 and 226. Each hinge flexure 220 and 222 has a center point 286 and 288, respectively. The bending motion resembles two smooth curves, the first terminating at center point 286, 288 in one direction and the second curve with an opposite curvature meeting the first curve at center point 286, 288. "S-bend" hinge flexures 220 and 222 ensure accelerometers 26a and 26b move in an essentially parallelogram motion, whereby the horizontal and vertical edges of proof masses 242a and 242b remain precisely parallel with the inner horizontal and vertical peripheral edges of accelerometer frame 218.

As indicated above, the "S-bend" hinge flexures 220 and 222, or leg flexures 224 and 226, provide an effective rotation of accelerometers 26a, 26b about pivot points 286 and 288. In an illustrative embodiment, the commonly applied dithering forces move accelerometers 26a and 26b through a positive and negative angular rotation with respect to their rest positions, whereby the centers of gravity 252a and b move from the center axis of accelerometer frame 218 for only a short distance for a dithering motion having an amplitude of about 8 micrometers along dithering axis 214.

The construction of accelerometers 26a and 26b from epitaxial layer 24 results in extremely close alignment of accelerometers 26a and 26b. This close alignment results from the high degree of flatness of epitaxial layer 24 and the relative proximity of accelerometers 26a and 26b micromachined from epitaxial layer 24. Accelerometer frame 218 and all of hinge flexures 220 and 222, or leg flexures 224 and 226, frame flexures 246 with first and second foot members 247 and 248, dither flexures 234, and pivot flexures 234 are similarly formed by micromachining using the full thickness of epitaxial layer 24 which ensures that input axes 38a and 38b are precisely perpendicular to dither axis 214, at least within the surface flatness and parallelism tolerances of epitaxial layer 24, which can typically be achieved to a high degree. Thus, this invention achieves close alignment of input and dither axes 38 and 214, whereby the problem of prior art Coriolis sensors with regard to such alignment is overcome. The suspension of accelerometers 26a and 26b by hinge flexures 220, 222 from opposing sides of accelerometer frame 218 ensures that their respective input axes 38a and 38b point in opposite directions and the use of the link 232 provide excellent nonlinearity motion cancellation.

As will be explained, the back-to-back orientation of accelerometers 26a and 26b ensures that the summed outputs of accelerometers 26a and 26b provide an accurate indication of linear acceleration. In addition, extraneous movements acting on accelerometers 26a and 26b will, at least to a first order of measure, tend cancel or dampen each other, whereby extraneous signals do not appear in the summed accelerometer outputs. In an analogous fashion when the difference of outputs of accelerometers 26a and 26b is taken, the canceling characteristics of these curves ensure that second order nonlinearities in the resultant angular rotation signal will also average.

The construction of the two accelerometers 26a and 26b from epitaxial layer 24 offers other advantages. For example, the configuration and the dimensions of accelerometers 26, the various flexures and link 232 may be determined with an extreme degree of accuracy, e.g., 0.2 micrometers so that the relative positions of these elements is controlled to a like degree. In another example, the construction of the various flexures in the plane of epitaxial layer 24 ensures that accelerometers 26 are dithered in that plane. As noted above, link 232 ensures that accelerometers 26a and 26b move in equal and opposite directions under the influence of the applied dithering motion. Thus, the centers of gravity 252a and 252b of accelerometers 26a and 26b are placed with a high degree of precision upon the center axis of epitaxial layer 24, which in turn is aligned with dither axis 214 with a high degree of precision, whereby the dithering motion is applied with a high degree of precision along the center axis of epitaxial layer 24. Such precision ensures that extraneous motions otherwise resulting from the dither motion are not imposed upon accelerometers 26a and 26b.

The suspension of accelerometers 26a and 26b by "S-bend" hinge flexures 220 and 222, which are formed in the plane of epitaxial layer 24, produces a motion of accelerometers 26a and 26b of relatively small, opposing arcs as a result of the dithering motion. In one illustrative embodiment, dithering at maximum displacement, i.e., amplitude, of 8 micrometers corresponding to 1.2 degrees of the total peak to peak angular travel, displaces accelerometers 26a and 26b from their center axis by a mere 1.7 micro-inches (420 angstroms). During a single cycle of motion of each of accelerometers 26a and 26b back and forth along dither axis 214, each accelerometer 26 is subjected to 2 translations as it rotates about its effective radius provided by its "S-bend" combination hinge/dither flexures 220 and 222. However, since these double translations or "bobbings" occur within the plane of epitaxial layer 24 and not along accelerometer input axes 38a and 38b, the problems associated with the prior art sensors of parallelogram configuration are avoided. For example, a corresponding double frequency error signal is not imposed upon the inputs of accelerometers 26, which required a phase servo adjustment in the processing as described in U.S. Pat. No. 4,799,385. In another example, the need to offset the center of oscillation or to couple turn-around acceleration into the accelerometer input axis is avoided. As a result, for any position of accelerometers 26a and 26b during their dithering motion, there is very little double frequency motion imposed upon their input axis 38, thus, there is no need to "steer" out the misalignment by adding a bias to the dither drive signal as was required in the prior art device.

The various features of epitaxial layer 24 may be micromachined by various techniques well known in the prior art such as a wet chemical etch or a dry chemical etch such as plasma etching, sputter etching or reactive ion etching (RIE). For a detailed discussion of such techniques, reference is made to the following publications, which are incorporated herein by reference: *VLSI Fabrication Principles* by Sorab K. Ghandhi and *Silicon Processing for the VLSI Era, Vol. 1—Process Technology* by S. Wolf & R. J. Tauber.

According to one illustrative embodiment of epitaxial layer 24, accelerometers 26 are coplanar with the center axis of epitaxial layer 24 within less than 0.2 micrometers. This coplanarity avoids imposing second harmonic distortion resulting from the dither drive into the rotational component signal outputted by accelerometers 26a and 26b. Otherwise, as is disclosed by the prior art parallelogram drive arrangements, such second harmonic drive distortion could be multiplied by the squaring action of double dipping to generate primary and third harmonics, which can be coupled into the rate channels as error. Thus, these errors are avoided by the side-by-side placement and accurate micromachining of accelerometers 26a and 26b within epitaxial layer 24.

As noted above, each of accelerometers 26a and 26b is suspended by "S-bend" hinge flexures 220 and 222, or leg flexures 224 and 226, which provide effective radii of rotation equal to that radius provided by link 232; without such construction, accelerometers 26a and 26b would dither with a non-sinusoidal motion. A non-sinusoidal dither motion would introduce high order harmonic distortion in the rate signal. Formation of the hinge flexures 220, 222 in epitaxial layer 24 coplanar with proof mass 242 avoids the coupling, however minor, due to an angular offset of the input axis 38 from the perpendicular relative to dither axis 214 and pendulous axis 250 resulting from proof mass centers of gravity 252 being off-set from hinge flexures 220, 222 in contrast to the structures of the prior art.

Shock stops 292a and 292b formed in epitaxial layer 24 limit the travel of link 232 parallel to rate axis 216 while shock stops 294*a* and 294*b*, also formed in epitaxial layer 24, limit the translation of link 232 parallel to dither axis 214. Similarly, shock stops 296*a* and 296*b* limit the horizontal translation of proof masses 242*a*, 242*b*, respectively. Thus, excessive motion along dither axis 214 and/or rate axis 216 due to external shock and/or vibration inputs is limited to a degree which is nondestructive to the various flexures and other elements of accelerometers 26.

Flux Path

As shown in FIG. 2A, conductive dither path 228 is deposited on the top surface of accelerometer frame 218, whereby a dither motion is imparted to each of accelerometers 26*a* and 26*b* by current passing through conductive dither path 228. Conductive dither path 228 is formed of a conductive material, preferably gold which is a relatively stable material readily deposited by conventional sputtering or deposition methods. Illustratively, the conductive material is deposited to a depth of 0.5 micrometer and a width of 25 micrometer, the resistance offered by such a length of the material as represented by conductive dither path 228 is minimal. Illustratively, conductive dither path 228 extends from the first external connector 230*a* up first frame support member 240*a*, horizontally across first pivot flexure 238*a* to link 232 where it reverses course and extends downwardly along a lower portion of link 232*b*, which is electrically isolated from an upper portion of link 232*a*, to cross horizontally first dither flexure 234*b* at the lower tip of link 232, conductive path again reverses course on proof mass 242*b* forming vertical path extending to and crossing both dither legs 224*b*, 226*b* of hinge/dither flexure 220*b* in parallel paths. That portion of conductive dither path 228 deposited on dither legs 224*b*, 226*b* of hinge/dither flexure 220*b* forms a first effective dither portion 228*b* for imparting a vibrating motion to accelerometer 26*b*. After crossing dither legs 224*b*, 226*b* to accelerometer frame 218, conductive dither path 228 again reverses direction and continues to the end of second frame support member 240*b* and horizontally across second pivot flexure 238*a* onto a second upper portion of link 232*a* and extends to the upper tip of link 232 where it horizontally crosses second dither flexure 234*a* onto second proof mass 242*a*, turns downwardly to cross both dither legs 224*a*, 226*a* of second hinge flexure 220*a* in parallel paths. That portion of conductive dither path 228 deposited on dither legs 224*a*, 226*a* of hinge/dither flexure 220*a* forms a second effective dither portion 228*a* for imparting a vibrating motion to accelerometer 26*a*. After crossing dither legs 224*a*, 226*a* to accelerometer frame 218, conductive dither path 228 ends at the second external connector 230*b*.

Additionally, in preferred embodiments of the invention, the metalization of conductive dither path 228 is deposited over essentially the entire area of support members 240*a*, 240*b* and over essentially the entire area of link 232, except for a small gap necessary to avoid shorting the drive legs of dither drive path 228. Such essentially complete metalization of support members 240*a*, 240*b* and link 232 allows inclusion of these members in the force-rebalance servo circuit as described below.

By depositing conductive path 228 on hinge/dither flexure 220 on the inboard side of proof mass 242 rather than on hinge/dither flexure 222 on the outboard side of proof mass 242, first and second effective dither portions 228*a*, 228*b* are closer to link 232 and the center of epitaxial layer 24, where the flux emanating from magnet 16 is stronger. Therefore, the interaction of the flux generated in first and second effective dither portions 228*a*, 228*b* interacts more strongly with the flux emanating from magnet 16 and less energy is required to drive the dither motion. Alternatively, conductive path 228 is deposited on legs 224, 226 of hinge/dither flexure 222 on the outboard side of proof mass 242, whereby first and second effective dither portions 228*a*, 228*b* are formed outboard of link 232 and the center of epitaxial layer 24.

Although the flux emanating from magnet 16 may not be as strong away from the center, a suitable choice of magnet 16 and a complementary current level in the drive signal effectively drives the dither motion of accelerometers 26 in the preferred embodiment.

In order to maximize the efficiency of generating the dither motion, conductive dither path 228 follows a path up along the inner peripheral edge of accelerometer 26*b* and its hinge flexure 220*b* and down the inner peripheral edge of accelerometer 26*a* and its hinge flexure 220*a*, which portions are closest to the center of the accelerometer frame 218, whereby the magnetic flux emanating from magnet 16 is concentrated to pass through these portions of conductive dither path 228. Conductive dither path 228 includes a first pair of effective portions acting on accelerometer 26*a* and identified by the numeral 228*a* mounted on legs 224*a*, 226*a* of hinge flexure 220*a* and a second pair of effective portions similarly but oppositely acting on accelerometer 26*b* and identified by the numeral 228*b* mounted on legs 224*b*, 226*b* of hinge flexure 220*b*, both effective portions 228*a* and 228*b* disposed within the concentrated magnetic flux generated by magnet 16. By so configuring the conductive path 228 and its effective portions 228*a* and 228*b*, the driving force of the dither motion is maximized.

The mass of link 232 is additive to that of proof masses 242*a*, 242. However, in a preferred embodiment, metalization is deposited on link 232 similarly to proof masses 242.

FIG. 2A also shows conductive dither pick-off path 229 deposited on the top surface of accelerometer frame 218, whereby a pick-off signal is generated which represents the dither motion imparted accelerometers 26*a* and 26*b* by the dither drive current passing through conductive dither path 228. Conductive dither pick-off path 229 is similarly formed of a conductive material deposited by conventional sputtering or deposition methods. Conductive dither pick-off path 229 extends up accelerometer frame 218 from a first external connector 290*a* across first foot member 247*b*, down first frame flexure 246*b* and across first foot member 248*b* to first proof mass paddle 242*b* where it reverses course and extends upwardly along an edge of proof mass paddle 242*b* to first hinge flexure 222*b* and crossing both legs 224*b*, 226*b* of hinge flexure 222*b* in parallel paths. That portion of conductive dither pick-off path 229 deposited on dither legs 224*b*, 226*b* of hinge flexure 222*b* forms a first effective dither pick-off portion 229*b* for detecting the vibrating motion of accelerometer 26*b*. After crossing dither legs 224*b*, 226*b* to accelerometer frame 218, conductive dither pick-off path 229 turns across accelerometer frame 218 and extends across the width of accelerometers 26*b* and 26*a* before reversing direction and continuing to the juncture of second foot member 247*a*, crossing to second frame flexure 246*a*, extends vertically upwardly to second foot member 248*a* and across onto second proof mass paddle 242*a* before again reversing direction and extending downwardly to cross both legs 224*a*, 226*b* of hinge/dither flexure 222*a* in parallel paths. That portion of conductive dither pick-off path 229 deposited on dither legs 224*a*, 226*a* of hinge flexure 222*a* forms a first effective dither pick-off portion 229*a* for detecting the vibrating motion of accelerometer 26*a*. After crossing dither legs 224*a*, 226*a* to accelerometer frame 218, conductive dither pick-off path 229 ends at the second external connector 290*b*.

As described above, conductive path 228 is alternatively deposited on legs 224, 226 of hinge/dither flexure 222, whereby first and second effective dither portions 228a, 228b are formed further from link 232 and the center of epitaxial layer 24. In such configuration, conductive dither pick-off path 229 is deposited on hinge/dither flexure 222, whereby first and second effective dither pick-off portions 229a and 229b for detecting the vibrating motion of accelerometers 26 are closer to link 232 and the center of epitaxial layer 24, where the flux emanating from magnet 16 is stronger. By depositing conductive dither pick-off path 229 on inboard hinge/dither flexure 220 rather than on outboard hinge/dither flexure 222, the pick-off voltage generated in effective dither pick-off portions 229a and 229b is stronger and interacts more strongly with the flux emanating from magnet 16 such that the dither pick-off signal is maximized.

In another alternative embodiment, conductive dither path 228 is deposited on one surface of accelerometer frame 218 and conductive dither pick-off path 229 is deposited on the second surface of accelerometer frame 218 opposite conductive dither path 228. In one example of this configuration, each of first and second effective dither portions 228a, 228b are formed on one surface of inboard dither legs 224, 226 of hinge/dither flexure 220 and each of first and second effective dither pick-off portions 229a, 229b are formed on an opposite surface of the same inboard dither legs 224, 226 of hinge/dither flexure 220. Thus, both the driving force of the dither motion and the dither pick-off signal are maximized.

Single Magnet Advantage

A significant advantage of this invention resides in the placement of first and second accelerometers 26a and 26b within epitaxial layer 24, whereby a single magnet/pole piece assembly 16 may be employed to direct magnetic flux through each of accelerometers 26a, 26b for the purposes of imparting the dithering motion to accelerometers 26a, 26b and detecting the dither motion imparted thereto. Sensor assembly 23 is mounted within the flux path assembly of magnet 16 and cubic return path 18 as shown in FIGS. 1A and 1B. Pivot point 236 forms the center of link 232 and accelerometer frame 218 as shown in FIG. 2A. Similarly, permanent magnet 16 is preferably of an extruded rectangular (shown), cylindrical, or cubic configuration having its central or longitudinal axis aligned with pivot point 236.

The assembly of magnet 16 with cubic return path 18 provides a flux path for the flux emanating from magnet 16 to pass primarily through first and second accelerometers 26a, 26b, before the flux returns through magnetically conductive case 36 into cubic return path 18. Thereafter, the flux passes through the volume of cubic return path 18 and into magnet 16 to complete the flux path. Placement of sensor assembly 23 between magnet 16 and case return 36 concentrates the magnetic flux to pass primarily through accelerometers 26a, 26b, such that when drive signals are applied to pass through dither conductor path 228 a dither motion is imparted to the accelerometers 26a, 26b. Similarly, the magnetic flux from magnet 16 passes through dither pick-off conduction path 229 such that, when pick-off signals are applied, a dither pick-off signal is generated in hinge/dither flexures 222a and 222b. Thus, because of the placement of accelerometers 26a and 26b in a side-by-side relationship within a single substantially planar epitaxial layer 24, a single magnet 16 and a simple flux path formed of cubic return path 18 and cover return 36, provides the magnetic flux to efficiently both effect the dithering motion of accelerometers 26a and 26b and generate the dither pick-off signal thereof.

The arrangement as shown in FIG. 2A of accelerometers 26a and 26b, their supporting flexures, frame flexures 246 with first and second foot members 247 and 248, and the interconnection accelerometers 26a and 26b by link 232 provide equal and opposite dither motion to accelerometers 26a and 26b, and help isolate hinge flexures 220, 222 from extraneous stress, such that error signals are not introduced by data processing into the resultant force signals F and rotational signals Ω and data processing using the output of accelerometers 26a and 26b by relatively simple differentiating and scaling techniques. Further, the structure of FIG. 2A may be implemented by conventional micromachining techniques upon epitaxial layer 24, whereby the resultant structure is produced in a small size at a low cost of which the prior art accelerometers were simply not capable. In turn, the extreme accuracy of construction afforded by micromachining techniques permits the relative placement of accelerometers 26a, 26b and link 232 to a precision in the order of 0.02 micrometer. This precision places accelerometers 26a, 26b in substantially precise balance with each other such that extraneous movements imposed upon accelerometer frame 218 do not upset this balance and do not introduce erroneous signals into the outputs of accelerometers 26a, 26b as may be otherwise caused by even slight misalignment of accelerometers 26a and 26b.

Figure 2B:
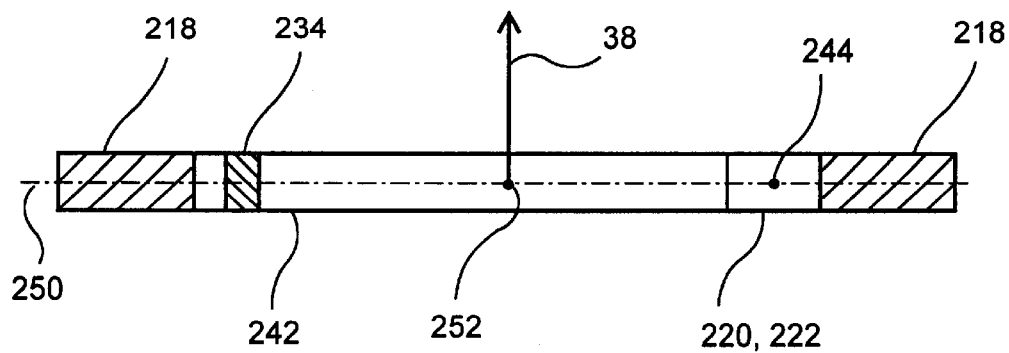
FIG. 2B is a cross-sectional view of the substrate and its accelerometer as taken along the line 2B—2B of FIG. 2A.

In FIG. 2B, the flexure or hinge axis is defined by the axis of rotation of the proof mass relative to substrate. A "center flexure" design places the Z-axis center of gravity (CG) at the mid-point of the flexure thickness on a pendulous axis which is parallel with the surface of the substrate. A center flexure, which is formed by etching the flexure material from both sides at once, is difficult to realize in bulk silicon designs like those described in above incorporated U.S. Pat. No. 5,241,861. Rather, bulk silicon designs typically teach forming the flexure from one side such that the center of gravity is off-set from the flexure mid-point. The off-set results in an inherent tilt of the input axis with respect to the substrate. Undesired moments may be produced by acceleration forces acting along the hinge axis to develop moments about the pendulous axis equal to the product of such forces times a moment arm or equivalent radius of rotation corresponding to the vertical distance between the rate axis and the center of gravity. Bulk silicon designs, for example, above mentioned U.S. Pat. No. 5,241,861, teach mounting the substrate at an angle with respect to the axis of the housing to compensate for the inability of forming a center-flexure. Therefore, another advantage of the sensor of the present invention is that a "center flexure" design is readily realized by etching the epitaxial layer from both sides at once which inherently places the Z-axis center of gravity (CG) precisely at the mid-point of the thickness of the epitaxial layer.

As shown in FIG. 2B, hinge flexures 220 and 222 permit proof mass 242 to pivot about hinge axis 244. A pendulous axis 250 is associated with each of accelerometers 26 and its proof mass 242. Each proof mass 242 has a center of gravity 252. Input axis 38 of each accelerometer 26 intersects its respective center of gravity 252 and is disposed perpendicular to pendulous axis 250. Pendulous axis 250 passes through center of gravity 252, hinge axis 244, dither flexure 234 and foot 248 (shown in FIG. 2A) interconnecting frame flexure 246 with proof mass 242. Input axes 38a and 38b are perpendicular with respect to accelerometer support frame 218 by virtue of the center flexure nature of hinge flexures 220, 222 such that no angular compensation is required when mounting sensor 10 to orient the input axes 38a, 38b to the vehicle or aircraft carrying sensor 10 of this invention as is used in mounting the sensor of the prior art. Also dither axis 214 intersects centers of gravity 252a and 252b of accelerometers 26a, 26b and is perpendicular to their input axes 38a and 38b. The center flexure nature of hinge flexures 220, 222 eliminates undesired moments produced by acceleration forces acting along hinge axis 244. Such undesired moments are developed in the sensor of the prior art because the hinge flexures are typically offset relative to the center of gravity of the proof mass. The offset of the prior art allows undesired moments to develop about the pendulous axis equal to the product of such forces times a moment arm or equivalent radius of rotation corresponding to the vertical distance between the rate axis and the proof mass center of gravity. The center flexure nature of hinge flexures 220, 222 avoids the offset and the associated issues just described.

Figure 2C:
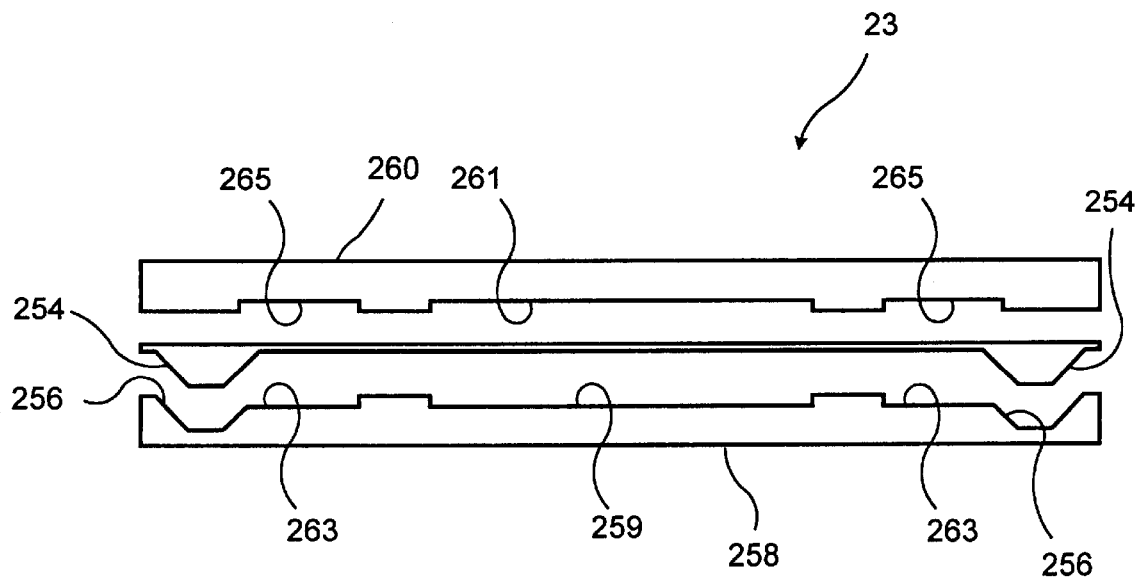
FIG. 2C is an end view of the sensor assembly, including the unitary epitaxial layer out of which are formed a pair of accelerometers and the opposing capacitor plates.

As shown in FIG. 2C, silicon substrate 39 is removed from epitaxial layer 24 using, for example, conventional (KOH) etching techniques preferably before the accelerometer details are cut in epitaxial layer 24. The process by which silicon substrate 39 is removed from the accelerometer details leaves support ribs 254 formed of silicon substrate 39 for later mating with channels 256 formed in a bottom cover plate 258 of sensor assembly 23. Sensor assembly 23 further includes an upper cover plate 260 which is described in detail below. A hard oxide layer is formed over the external surfaces of all the accelerometer details formed in epitaxial layer 24. As taught by above incorporated U.S. Pat. No. 5,205,171, the oxide layer is pierced and epitaxial layer 24 is connected to ground to hold proof mass 242 at ground potential. In FIG. 2A, the connection to ground is made by depositing a metallic bond pad 262 formed of a conductive material, for example, gold, at the break in the oxide layer, and interconnecting bond pad 262 to system ground, for example, "GND" bond pad on external surface of upper cover plate 260 in one of several manners common to the integrated circuit industry, for example, by a wire bond.

Epitaxial layer 24 in which accelerometers 26 are formed is sandwiched between lower cover plate 258 and upper cover plate 260 in sensor assembly 23. Lower cover plate 258 and upper cover plate 260 are preferably formed of second and third silicon substrates, preferably plain silicon substrates of a standard thickness. For example, bottom cover plate 258 is formed of a standard 625 micrometer thick silicon substrate and upper cover plate 260 is formed of a standard 525 micrometer thick silicon substrate, each of which is a standard thickness used in the integrated circuit industry.

Each of lower and upper cover plates 258, 260 are formed with small set-back or recessed areas 259 and 261, respectively, corresponding to all the regions of epitaxial layer 24 occupied by the moving portions of accelerometers 26, including at least proof masses 242a, 242b and link 232, support members 240, each of foot members 247 and 248, and all of dither flexures 234, pivot flexures 238, frame flexures 246, and hinge flexures 220 and 222, whereby accelerometers 26 are free to pivot about hinge axis 244 when accelerating forces are applied along input axis 38. Set-back areas 259 and 261 are preferably on the order of about 4 micrometers deep to permit movement of proof masses 242a, 242b and to provide mechanical stops for them. Set-back areas 259 and 261 are formed using conventional methods, for example, a potassium hydroxide (KOH) etch. Preferably, set-back areas 259, 261 are formed in a single process, whereby the process forms set-back areas 259, 261 with substantially matching depths. Each of lower and upper cover plates 258, 260 are also formed with substantially matching set-back areas 263 and 265, respectively, sized to accept a continuously screened glass bonding frit in the area designated "BOND PAD" in FIG. 2A. Substantially matching set-back areas 263 and 265 provide space for the glass frit, whereby silicon-to-silicon contact is achieved between lower and upper cover plates 258, 260 in the area designated "TOUCH DOWN" in FIG. 2A.

Figure 2F:
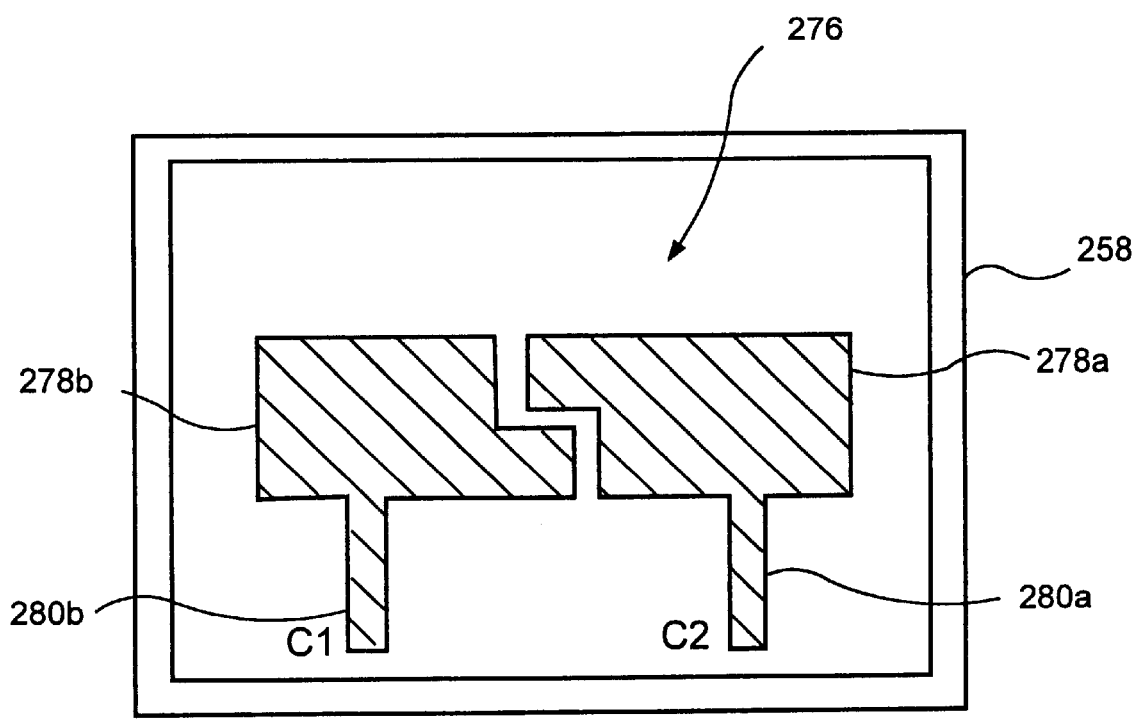
FIG. 2F shows the interior of the lower cover plate which is adjacent the epitaxial layer opposite the upper cover plate when assembled into sensor assembly, including the conduction pattern deposited thereon.

FIGS. 2D, 2E and 2F illustrate conduction patterns deposited on lower and upper cover plates 258, 260 over an oxide layer. Each of upper and lower conduction patterns 258, 260 are formed of a conductive material, for example, gold, deposited by conventional sputtering or deposition methods. FIG. 2D shows the portion of upper cover plate conduction pattern 266 deposited on the bottom or interior of upper cover plate 260 which is adjacent epitaxial layer 24 when assembled into sensor assembly 23. FIG. 2E shows that portion of upper cover plate conduction pattern 266 deposited on the top or exterior of upper cover plate 260 which is opposite epitaxial layer 24 when assembled into sensor assembly 23. In FIG. 2D, upper cover plate conduction pattern includes two upper electrodes 268a and 268b corresponding to accelerometers 26a and 26b, respectively. Each of upper electrodes 268a, 268b are positioned such that they are in opposition to proof masses 242a, 242b, respectively, when upper cover plate 260 is mated with epitaxial layer 24 containing accelerometers 26a, 26b. Upper electrodes 268a, 268b are preferably oversized relative to the area of proof masses 242a, 242b, respectively, whereby the translation and rotation of each proof mass 242 imparted thereto by the dither motion is transparent to the capacitive acceleration signal. Oversizing upper electrodes 268a, 268b also accounts for slight discrepancies in manufacturing and assembly misalignments. Upper electrodes 268a, 268b extend inwardly of proof masses 242a, 242b extending at least across the regions of epitaxial layer 24 occupied by link 232 and support members 240a, 240b, whereby, in a preferred embodiment, link 232 and support members 240a, 240b are included in the force-rebalance servo circuit as described below.

Upper conduction pattern 266 further includes conduction paths 270a and 270b wrapping from the interior surface of upper cover plate 260 through a window 272 formed in upper cover plate 260. In FIG. 2E, exterior conduction paths 274a and 274b are continuations of conduction paths 270a and 270b wrapping from the interior surface of upper cover plate 260 through window 272. Exterior conduction paths 274a and 274b are connected to metallic bond pads 276a and 276b formed on the exterior surface of upper cover plate 260. Metallic bond pads 276a, 276b on the exterior surface of upper cover plate 260 provide electrical contacts for interconnection with the sensor circuitry.

As shown in FIG. 2F, lower cover plate 258 is deposited with a lower conduction pattern 276 which includes lower electrodes 278a and 278b. Lower electrodes 278a, 278b are similarly oversized relative to the areas of proof masses 242a, 242b, respectively, to account for slight discrepancies in manufacturing and assembly misalignments. Lower electrodes 278a, 278b similarly extend inwardly of proof masses 242a, 242b extending across the regions of epitaxial layer 24 occupied by link 232 and support members 240a, 240b. Symmetry between opposing surfaces of proof masses 242a, 242b and between opposing upper and lower electrodes 268 and 278 minimizes bias and maximizes dynamic range and linearity. Lower conduction pattern 276 also includes conduction paths 280a and 280b which provide metallic bond pads accessible for wire bonding to bond pads 282a and 282b (shown in FIGS. 2A and 2E) on the exterior surface of upper cover plate 260 through window 272 in upper cover plate 260. As shown in FIG. 2C, lower cover plate 258 is formed with channels 256 sized to mate with support ribs 254 formed in silicon substrate 39, whereby accelerometers features formed in epitaxial layer 24 are positioned relative to at least lower cover plate 258 and the features formed thereon. Channels 256 are positioned outside the area occupied by accelerometers 26 and preferably outside the area of sensor assembly 23 remaining after dicing at area designated "DICING LINES" in FIG. 2A. In other words, mating ribs 254 and channels 256 are cut away during the dicing process after assembly. The glass frit screened into matching setback areas 263, 265 join epitaxial layer 24, formed with accelerometers 26, between lower and upper cover plates 258, 260 with continuous matching patterns of glass frit in the area designated "BOND AREA" in FIG. 2A to form sensor assembly 23.

During operation, each of accelerometers 26 balance applied acceleration forces by applying electrical restoring forces to proof masses 242 through upper and lower electrodes 268 and 278. Both AC and DC signals are applied to upper and lower electrodes 268 and 278. Capacitances formed between upper electrode 268 and a first side of proof masses 242 and between lower electrode 278 and a second side of proof masses 242 are coupled to a force-rebalance circuit which is discussed in detail below. The force-rebalance circuit drives an electrostatic restoring force based on the difference in capacitance thereby balancing the applied acceleration forces to restore each of proof masses 242 to a neutral position between opposing lower and upper cover plates 258, 260.

Force Rebalance Circuit

During operation, an applied acceleration causes relative motion between proof masses 242 and upper and lower electrodes 268, 278 as proof masses 242 attempt to pivot about hinge flexures 220, 222. An imbalance in capacitances between proof masses 242 and upper and lower electrodes 268, 278 results. The sensor circuitry balances the capacitance imbalance by applying an electromotive force (EMF) to each of upper and lower restoring electrodes 268, 278 to move each proof mass 242 to a neutral position between upper and lower electrodes 268, 278 and hold it there. For example, as proof mass 242 moves and approaches one of upper and lower electrodes 268, 278 and simultaneously recedes from the other, an increased capacitive pickup of the AC signal causes a compensation circuit to apply a decreased DC signal voltage to the approaching electrode and to increase the signal voltage applied to the receding electrode, whereby an electrostatic force is applied to each proof mass 242 to resist the force of acceleration and restore each proof mass 242 to a neutral position. Cover return 36 of sensor 10 is grounded to shield the transducer from extraneous outside electrical fields.

As discussed above, link 232 is displaced along input axis 38 with proof masses 242a, 242b in response to a linear acceleration input. Therefore link 232 forms an additional portion of the linear acceleration reaction mass nominally represented by proof masses 242 and must be accounted for in the output of accelerometers 26. Accordingly, in preferred embodiments of the invention, the metalization of conductive dither path 228 is deposited over essentially the entire area of support members 240a, 240b and over essentially the entire area of link 232, whereby support members 240a, 240b and link 232 are included in the force-rebalance servo circuit.

The polarity of upper and lower electrodes 268, 278 are arranged to form a first accelerometer 26a having a positive output in response to a positively applied acceleration force and a second accelerometer 26b having a negative output in response to a positively applied acceleration force, whereby the sensed acceleration is determined by taking the difference between outputs of first and second accelerometers 26a and 26b, and the Coriolis rate is determined by demodulating the sum of the outputs of first and second accelerometers 26a and 26b.

Figure 3:
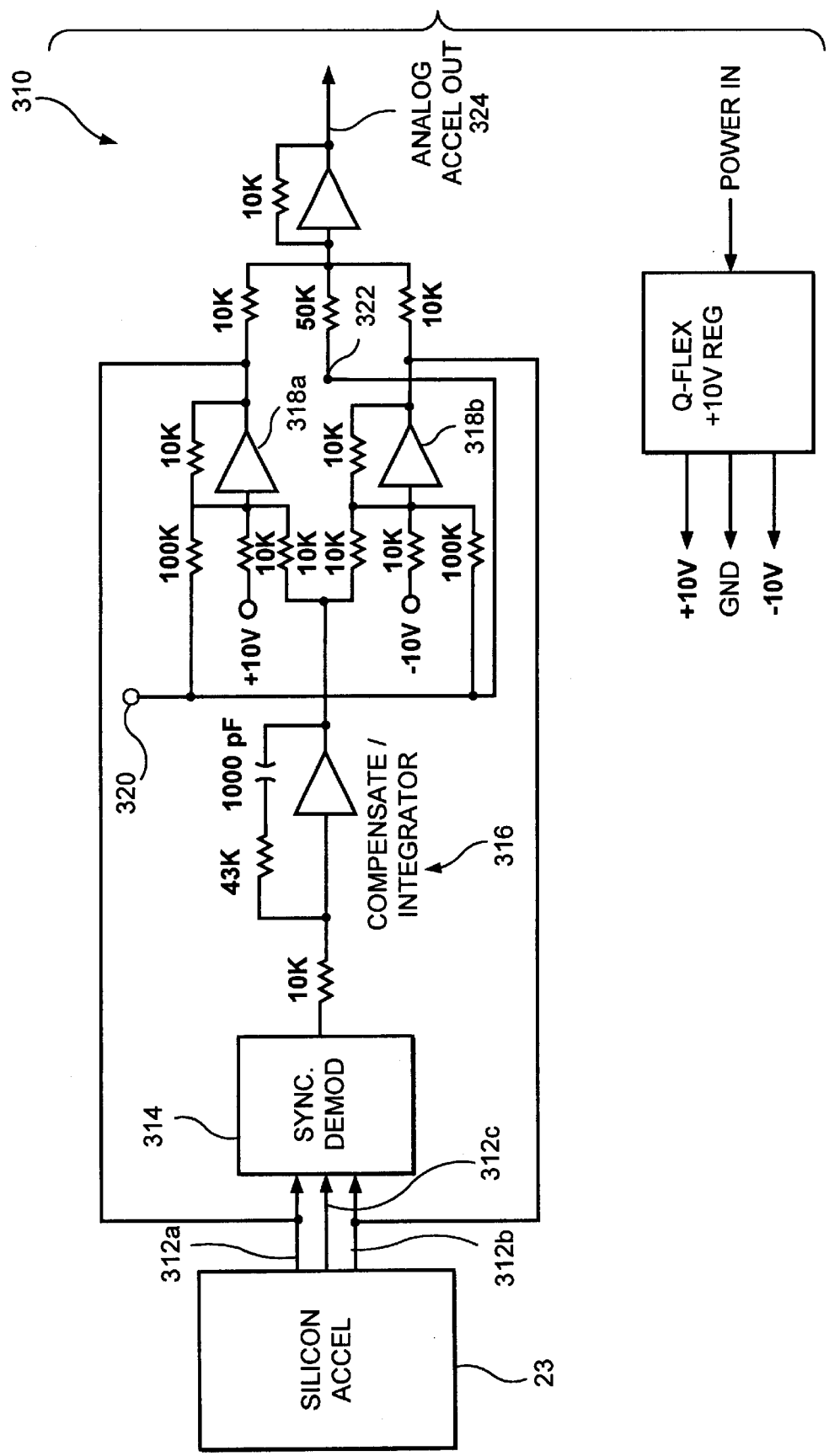
FIG. 3 illustrates one example of an accelerometer force-rebalance circuit.

FIG. 3 illustrates one example of an accelerometer force-rebalance circuit. Other useful circuits are known to those of ordinary skill in the pertinent art, for example, each of above incorporated U.S. Pat. No. 4,336,718 and above incorporated U.S. Pat. No. 5,205,171 teach useful accelerometer force-rebalance circuits. In the accelerometer force-rebalance circuit 310 of FIG. 3, the signal of upper electrode 268 of sensor assembly 23 is output at 312a, the signal of lower electrode 278 is output at 312b, and the signal of proof mass 242, which is at ground potential in this embodiment, is output at 312c. Output signals 312 are input to synchronous demodulator 314 of known design. The output of synchronous demodulator 314 feeds a compensation integrator circuit 316. The output of compensation integrator circuit 316 is inverted by inverting operational amplifiers 318a and 318b and summed separately into each offset and each electrode. Accelerometer force-rebalance circuit 310 also provides for the alignment voltage to be summed into the feed-back signal at node 320 and subtracted from the output at node 322, whereby the summing in of the alignment signal is transparent, i.e. not visible, in the analog accelerometer output signal 324.

Dither Drive

Dither drive circuits are known to those of skill in the pertinent art. For example, each of above incorporated U.S. Pat. Nos. 5,241,861 and 4,590,801 illustrate such circuits. The invention uses a commonly known dither drive circuit to apply a sinusoidal voltage across the effective portions 92a and 92b of conductive dither path 228. As described above, conductive dither path 228 forms first effective portion 228b deposited on beams or dither legs 224b, 226b of hinge/dither flexures 220b for imparting a vibrating motion to the accelerometer 26b and second effective portion 228a similarly deposited on beams or dither legs 224a, 226a of hinge/dither flexures 220a for imparting a vibrating motion to the accelerometer 26a. The entirety of epitaxial layer 24 is held at ground potential via ground terminal 262. As described in FIGS. 1A through 1C, a magnetic field is generated perpendicular to the surfaces of epitaxial layer 24 and is directed through accelerometers 26a and 26b and the effective portions 228a and 228b disposed thereon. Effective portions 228a and 228b are connected in series between external connectors 230a and 230b as described above. A single drive voltage applied to effective portions 228a and 228b through external connectors 230a and 230b generates a current in external connectors 230a and 230b. The flux generated by magnet 16 interacts with the flux generated by the current flowing through the effective portions 228a and 228b to create a dither drive force F which moves accelerometers 26a and 26b in a substantially rectilinear, vibrating movement back and forth along dither axes 214 (shown in FIG. 2A).

Accelerometers 26a and 26b vibrate or dither at their resonant, natural frequency $f_o$ determined by the mechanical characteristics of sensor assembly 23, including the spring rates of hinge/dither flexures 220, 222 and the mass of accelerometers 26a and 26b. The dither drive signal outputted by the dither drive circuit is of a frequency corresponding to the frequency $f_o$ of dither vibration and, as explained above, is used in the further processing of the accelerometer outputs to demodulate those signals to provide a force signal F and a rotational signal Ω.

FIG. 2A also shows conductive dither pick-off path 229 deposited on the top surface of epitaxial layer 24, whereby a pick-off signal is generated which represents the dither motion imparted to accelerometers 26a and 26b by the dither drive current passing through conductive dither path 228. As accelerometers 26a and 26b are vibrated, effective pick-off portions 229a and 229b move through the magnetic field created by the unitary magnet 16, a current is induced therein and the resultant voltage is fed back to the dither drive signal.

The configuration of accelerometers 26a and 26b within epitaxial layer 24 and flux path generated by magnet 16, case return 36 and cubic return path 18 develops a considerable force in excess of the damping losses to maintain the dither motions of accelerometers 26a and 26b. Those of ordinary skill in the art understand that a minimum turn-around acceleration is needed to cause each of accelerometers 26a and 26b to stop going in one direction and to accelerate in the opposite, whereby the dithering motion may occur. The acceleration force F tending to maintain the dithering motion of accelerometers 26a and 26b is set out by the following equation:

$$F = L \cdot i \times B \quad (1)$$

where i is the current passing through the conductive path 228 making up the effective portions 228a and 228b, L is the effective length of that portion of the conductive path 228 within the magnetic flux passing through accelerometers 26a and 26b, i.e., the length of the effective portions 228a and 228b, and B is the magnitude of the flux. In an illustrative embodiment of this invention, a current of 3.5 milliamp may be applied to each of the effective portions 228a and 228b, the effective portions 228a and 228b may have an effective length L of 1 mm and 5 kilogauss may be readily provided by magnet 16 with cubic return path 18 and case return 36. Solving equation (1), it is shown that a force F of 0.3 milligrams may be readily developed by this illustrative embodiment. In such an embodiment, the resonant frequency of the dithering motion imposed upon accelerometers 26a and 26b is approximately 10 kHz and a displacement D of accelerometers of 8 micrometer. The drive acceleration a may be calculated by the following:

$$a = \frac{D(2\pi f)^2}{K} \quad (2)$$

where D is the displacement, f is the dither frequency and K is a conversion factor. The calculated acceleration for 8 micrometer of displacement D at 10 kHz is 3,200 g's peak acceleration. Where the mechanical gain of the spring mass system formed by accelerometers Q is set at a value of 6,400, the force developed by the interaction of a current passing through conductive path 228 and the magnetic flux directed through accelerometers 26, is 0.3 milligrams. This force is sufficient to accelerate the calculated mass force of 0.07 milligrams. It is noted that the Q of pure crystals may be as high as 10,000, demonstrating that the dithering system described above is more than capable of developing sufficient force to effect the required dithering drive motion.

The following calculations demonstrate that the values of ϵ, the voltage induced in the pick-off portions 229a and 229b, are provided by the following equation:

$$\epsilon = v \times B \cdot L \quad (3)$$

where v is the amplitude of the velocity output signal of accelerometers 26; B is the strength of the magnetic field crossing the effective portions 229a and 229b; L is the effective length of the conductor within the magnetic flux field. For a dither displacement D of 8 micrometer, a natural frequency of accelerometer of 10 kHz, a velocity signal v of approximately 0.5 meter/second, a length L of the effective portions 229a and 229b of 1 mm, and a flux strength of 5 kilogauss, the output of a single pick-off portion 229a is 0.25 millivolt. If the outputs of accelerometers 26a and 26b are connected in series as shown, the output voltage is doubled to 0.5 millivolt.

The accuracy with which rate and acceleration sensor 10 may be made, the symmetry of accelerometers 26a and 26b and their suspension by the flexures 220 and 222, and the interconnection of link 232 to impose equal and opposite motions on accelerometers 26a and 26b, have an accumulative effect to greatly simplify the processing of the accelerometer output signals, essentially reducing it to a cosine demodulation step. This can be done every half cycle as was shown in the prior art. Basically, the outputs of accelerometers 26a and 26b are subtracted from each other to provide the linear acceleration signal and to average both signals while inverting every other sample to demodulate for the cosines to produce a rate of rotation signal ω. Neither an alignment servo nor a phase servo is needed for such processing thus increasing the band width of the rotational acceleration signal Ω to be 6 kHz in one illustrative embodiment of this invention.

Rate and acceleration sensor 10 has a sensitivity to rotational acceleration imposed about its rate axis 216, i.e., the moment of each of accelerometers 26a and 26b about rate axis 216, which acceleration sensitivity will introduce an undesired noise component in the subsequent demodulation processing of the accelerometer output signals. As taught in above incorporated U.S. Pat. No. 5,241,861, that noise component can be effectively eliminated by differentiating the rotation rate signal ω and scaling it. In effect, the demodulated outputs of accelerometers 26 are a measure of its rotation rate signal ω, which can be differentiated to obtain an indication of the angular acceleration of each accelerometer 26. Since the dimensions and, in particular, the distance between rate axis 216 and each of center of gravity 252a and 252b is known to a high degree of precision, e.g., 0.2 micrometer, that equivalent radius of rotation is multiplied by a measured angular acceleration force to obtain an accurate indication thereof of the linear acceleration caused by the angular acceleration. The calculated acceleration moment is subtracted from the accelerometer outputs to reduce or substantially eliminate such acceleration sensitivity.

FIG. 4A shows the channel block diagram 450 which includes a difference amplifier 412 to form the linear acceleration output from accelerometers 26. A low pass filter 414 is used to filter out any remaining dither induced rate signals in the linear acceleration output. A summing amplifier 416 in the rate AC signal path is used to amplify the rate AC signal to increase sensitivity. This signal is demodulated in a cosine demodulator 418 to form a rate proportional voltage. Similarly, a low-pass filter 420 sets the bandwidth and reduces the ripple such that the signal is compatible with an analog-to-digital (A/D) converter, for example, a 16-bit analog-to-digital converter.

The dither drive circuit 422 may take the form of that circuit shown in any of above incorporated U.S. Pat. No. 5,241,861 and U.S. Pat. No. 4,590,801 which illustrate such circuits or another suitable dither drive circuits as are known to those of skill in the pertinent art. Dither drive circuit 422 is a closed loop oscillator that runs at the natural frequency of sensor assembly 23. The velocity is sensed by dither pick-off circuit 229 and used in dither drive circuit 228 to drive accelerometers 26 perpendicular to acceleration input axes 38. The output of the dither drive loop is used as an input to a phase-lock loop (PLL) 424 to drive the rate channel demodulator. Since the accelerometer bandwidth is set exactly to the dither frequency, there is a 90° shift of the rate data which is provided by phase-lock loop 424. Phase-lock loop 424 also filters the dither crossing noise. Active axis alignment is performed by sine demodulator 426 which feeds back an offset to the servo loops of accelerometers 26. A small amount of the turn-around acceleration from dither drive circuit 422 is used in sine demodulator 426 to cancel any sine modulation from sources such as thermal stress, mechanical packaging stress, processing errors and wafer flatness imperfections.

Figure 4B:
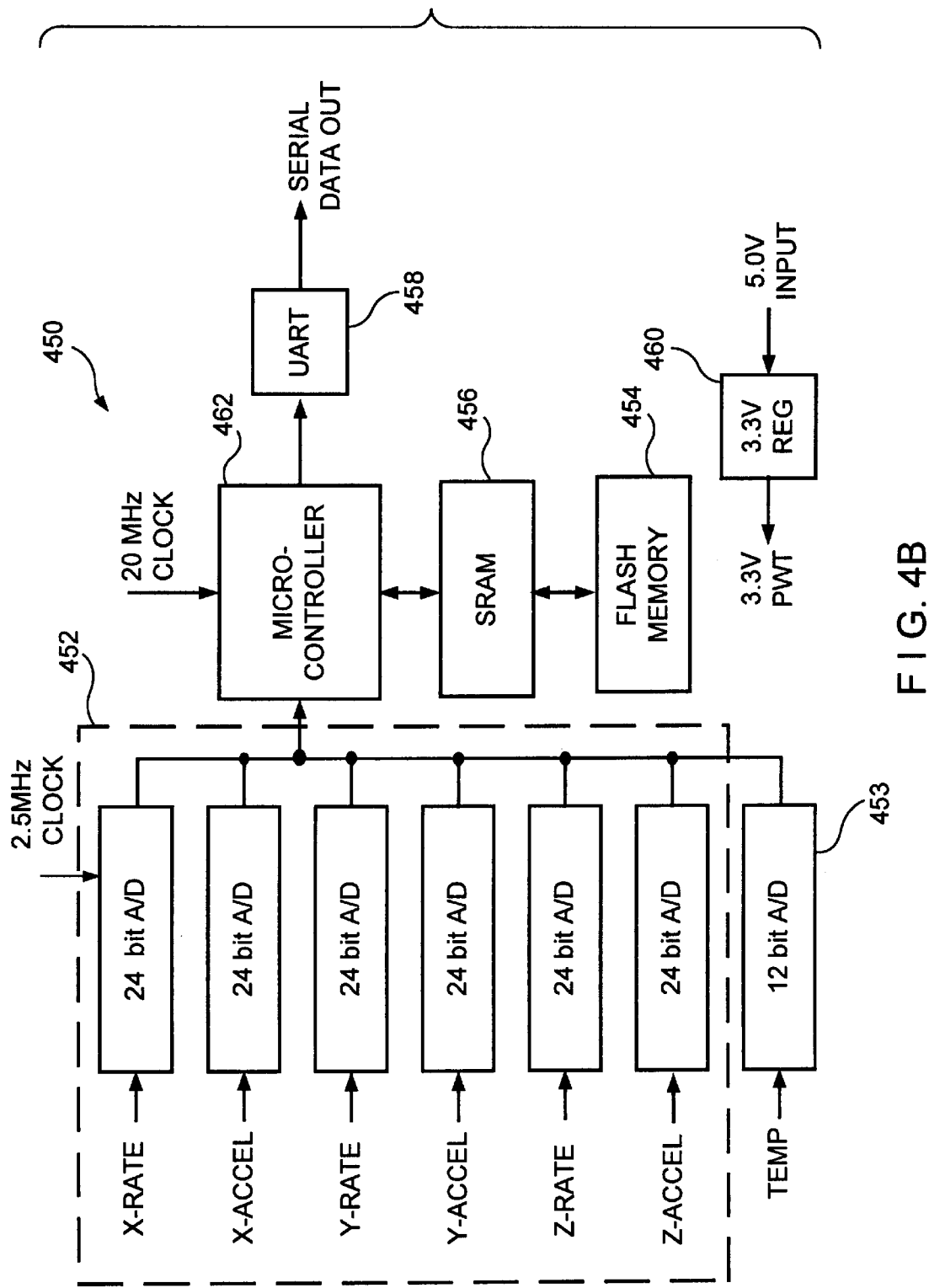
FIG. 4B shows a channel block diagram which includes a difference amplifier to form the linear acceleration output from the accelerometers.

FIG. 4B illustrates the central processing unit (CPU) 450 in which the six analog sensor outputs from the three sensor assemblies 23 mounted on orthogonal faces of cubic return path 18 are converted to a digital format. A bank of six sigma-delta converters 452 continuously read the rate and acceleration voltages and output from each of the three sensor assemblies 23 and output a serial word. Data rates of 1000 degrees/second can be resolved to a 1 degree/hour rate using a 24-bit resolution data word. Central processing unit 450 is optionally a generally available low cost microcontroller type capable of handling the data reads, reading temperature from a conventional 12-bit analog-to-digital converter 453, correcting for bias and scale factor over temperature using computer models, and correcting for axis misalignment, whereby corrected data is provided to a host computer for the performance of navigation functions. The inertial measuring unit (IMU) processor would require an external circuit card or could be integrated in functionally with the host processor. Central processing unit 450 further preferably includes flash memory 454, random access memory (RAM) 456, a serial universal asynchronous receiver-transmitter (UART) 458 and a voltage regulator 460, for example, 3.3V regulator. Power of the inertial measuring unit is contemplated to be about 0.5 Watts for a total of about 1 Watt including the rate and acceleration sensor power.

As explained in detail in above incorporated U.S. Pat. No. 4,786,861, $\Delta v$ is provided by the following equation:

$$\Delta v_i = A[(N1_i - N2_i) + FT + B(N1_i + N2_i)] \quad (4)$$

where vi is the "ith" sample of the velocity signal, A and F are scale factors, $N1_i$ is the count derived from a first counter over a 1k Hz (1 m sec) period for the "ith" sample, $N2_i$ is the count obtained from a second counter for the "ith" sample, T is the time period and B is the bias correction term. As well known in the art, $\Delta \theta_i$ is provided by the following equation:

$$\Delta \theta_i = a(\cos N1_i + \cos N2_i) + b(\cos N1_i - \cos N2_i) \quad (5)$$

where a is a scale factor and b is a bias/correction term, and $$\cos(N1_i) = N1_i - N1_{(i-1)}, \text{ over each 10 kHz period or} \quad (6)$$

$$\cos(N1_i) = (-1)^i N1_i, \text{ at 10 kHz rate}. \quad (7)$$

Angular acceleration $\alpha$ is equal to the linear acceleration as derived from the output of either of accelerometers 26a or 26b, divided by the equivalent radius of rotation, $r_{eq}$ in accordance with the following equation:

$$\alpha = A_{linear}/r_{eq} \quad (8)$$

In turn, angular acceleration $\alpha$ is a function of the measured rotation rate $\omega$ in accordance with the following equation:

$$\alpha = d\omega/dt \quad (9)$$

In turn, the rotation rate may be expressed as follows:

$$\omega = d\theta/dt \quad (10)$$

Since the derivative of the rotation rate $\omega$ is equal to acceleration $\alpha$, acceleration may be expressed by the following equation:

$$\alpha = \frac{\omega_i - \omega_{(i-1)}}{\Delta t} = \frac{\frac{\Delta \theta_i}{\Delta t} - \frac{\Delta \theta_{(i-1)}}{\Delta t}}{\Delta t} \quad (11)$$

Thus, correction for linear acceleration Alinear is provided by the following equation:

$$A_{linearcorrection} = \alpha r_{eq.} = r_{eq.} \frac{\frac{\Delta \theta_i}{\Delta t} - \frac{\Delta \theta_{i-1}}{\Delta t}}{\Delta t} \quad (12)$$

In turn, the microprocessor 462 is programmed in a conventional fashion to subtract values of $A_{linear\ correction}$ from the accelerometer outputs f1 and f2 to correct for angular acceleration.

The foregoing is illustrative of the present invention and is not to be construed as limiting thereof. Variations and modifications will be readily apparent to those of skill in the art. The invention is defined by the following claims, with equivalents of the claims to be included therein.

What is claimed is:

1. An apparatus for measuring the specific force and angular rotation rate of a moving body, the apparatus comprising:

a) a layer of epitaxial material having first and second substantially planar surfaces disposed substantially parallel to each other;

b) a frame formed of said layer of epitaxial material, said frame having a vibration axis disposed substantially parallel to said first and second surfaces;

c) a first accelerometer formed of said layer of epitaxial material and having a first force sensing axis perpendicular to said vibration axis for producing a first output signal indicative of the acceleration of the moving body along said first force sensing axis, said first accelerometer having a proof mass and at least one flexure connecting said proof mass to said frame such that said proof mass can be moved along each of said first force sensing axis and said vibration axis;

d) a second accelerometer formed of said layer of epitaxial material and having a second force sensing axis perpendicular to said vibration axis for producing a second output signal indicative of the acceleration of the moving body along said second force sensing axis, said second accelerometer having a proof mass and at least one flexure connecting said proof mass to said frame such that said proof mass can be moved along each of said second force sensing axis and said vibration axis;

e) an electrical circuit coupled to each of said first and second accelerometers for imparting a dithering motion thereto of a predetermined frequency along said vibration axis; and f) said layer of epitaxial material having a rate axis perpendicular to each of said first and second force sensing axes and said vibration axis, whereby said first and second output signals have a Coriolis component indicative of the angular rotation of the moving body about said rate axis.

2. The measuring apparatus of claim 1, wherein said first and second force sensing axes are both oriented at the same angle with respect to said first and second surfaces.

3. The measuring apparatus of claim 1, wherein said first and second force sensing axes are both oriented essentially perpendicular to said first and second surfaces.

4. The measuring apparatus of claim 3, wherein said first force sensing axis extends in a direction opposite to that of said second force sensing axis.

5. The measuring apparatus of claim 1, wherein said flexure of said first accelerometer connecting said proof mass to said frame comprises a first pair of flexures; and said flexure of said second accelerometer connecting said proof mass to said frame comprises a second pair of flexures.

6. The measuring apparatus of claim 5, wherein each of said first and second pairs of flexures is primarily an S-bend flexure.

7. The measuring apparatus of claim 6, wherein each of said first and second pairs of flexures is formed of said layer of epitaxial material.

8. The measuring apparatus of claim 7, further comprising a link having first and second points connected respectively to said first and second accelerometers, a pivot point disposed between said first and second connected points, and one or more supports affixedly disposing said pivot point with respect to said frame to permit said link to pivot thereabout and, when one of said first and second accelerometers is moved, to impart a substantially equal and opposite motion to said other of said first and second accelerometers.

9. The measuring apparatus of claim 8, wherein each of said supports comprises a pivot flexure.

10. The measuring apparatus of claim 9, wherein each of said pivot flexures has a length and cross-sectional dimensions such that said pivot flexures flex with a combination of simple bending and S-bend motion.

11. The measuring apparatus of claim 8, wherein each of said accelerometer vibrates at its natural frequency and link has a natural frequency essentially matched to said natural frequency of said accelerometers.

12. The measuring apparatus of claim 8, wherein said pivot point is disposed intermediate between said first and second connected points.

13. The measuring apparatus of claim 12, wherein said frame further comprises one or more surfaces restricting the motion of said link.

14. The measuring apparatus of claim 12, wherein said frame further comprises one or more surfaces restricting the motion of each said proof mass.

15. The measuring apparatus of claim 12, wherein said link is formed having a shape essentially symmetrical about said pivot point.

16. The measuring apparatus of claim 12, wherein said link is formed having an essentially rectangular shape symmetrical about said pivot point.

17. The measuring apparatus of claim 12, wherein each said proof mass is flexibly connected to said frame for motion along a respective one of said force sensing axes and each said proof mass includes a free end, said free end of a first of said proof masses connected to said link on one side of said pivot point and said free end of a second of said proof masses connected to another side of said link opposite said pivot point.

18. The measuring apparatus of claim 17, wherein each said proof mass is connected to said link by flexures.

19. The measuring apparatus of claim 18, wherein said free ends of said first and second proof masses are connected to said frame.

20. The measuring apparatus of claim 18, wherein said free ends of said first and second proof masses are connected to said frame by flexures.

21. The measuring apparatus of claim 5, further comprising a conductive path coupled to said electrical circuit, said conductive path disposed on at least one of said first and s econd surfaces of said layer of epitaxial material to traverse said first and second accelerometers.

22. The measuring apparatus of claim 21, further comprising a magnetic flux generator producing magnetic flux intersecting said conductive path and wherein said electrical circuit comprises a signal generator for producing a periodic drive signal having a predetermined frequency to said conductive path, whereby said drive signal interacting with said magnetic flux causes said first and second accelerometers to vibrate along said vibration axis.

23. The measuring apparatus of claim 21, wherein said conductive path forms a first conductive path and said electrical circuit includes a signal processor for processing a pick-off signal; and further comprising a second conductive path disposed on at least one of said first and second surfaces of said layer of epitaxial material to traverse said first and second accelerometers, said second conductive path coupled to said electrical circuit and intersected by said magnetic flux, whereby said magnetic flux generates a pick-off signal in said second conductive path representative of the vibration of said first and second accelerometers along said vibration axis.

24. The measuring apparatus of claim 23, wherein one of said first and second conductive path is disposed across one of said first pair of flexures connecting said proof mass of said first accelerometer to said frame, across said link, and across one of said second pair of flexures connecting said proof mass of said second accelerometer to said frame.

25. The measuring apparatus of claim 23, wherein one of said first and second conductive path is disposed across that flexure of said first and second pairs of flexures disposed closest to said link.

26. The measuring apparatus of claim 25, wherein the other one of said first and second conductive path is disposed across that flexure of said first and second pairs of flexures disposed farthest from said link.

27. The measuring apparatus of claim 23, wherein each of said first and second conductive paths is disposed on the same one of said first and second surfaces of said layer of epitaxial material.

28. The measuring apparatus of claim 27, wherein said first conductive path is disposed across that flexure of said first and second pairs of flexures disposed closest to said link and said second conductive path is disposed across that flexure of said first and second pairs of flexures disposed farthest from said link.

29. The measuring apparatus of claim 28, wherein said first conductive path is additionally disposed across said link.

30. The measuring apparatus of claim 7, further comprising a link having first and second points connected respectively to said first and second accelerometers and a pivot point disposed a radial length from each of said first and second connected points, one or more flexures mounting said link to said frame to permit said link to pivot about said pivot point and, when one of said first and second accelerometers is moved, to impart an equal and opposite motion to the other one of said first and second accelerometers, each of said first and second pairs of flexures providing an effective radius of a length essentially equal to that of said radial length of said link.

31. The measuring apparatus of claim 30, wherein said frame includes first and third inner peripheral edges disposed substantially parallel to said vibration axis and wherein said first pair of flexures connect a first peripheral edge of said first accelerometer to said first innerperipheral edge and said second pair of flexures connect a first peripheral edge of said proof mass of said second accelerometer to said third innerperipheral edge such that each said first peripheral edge of each said proof mass moves substantially parallel with respect to said first and third innerperipheral edges of said frame.

32. The measuring apparatus of claim 31, wherein said first and third inner peripheral edges form two sides of an essentially rectangular configuration.

33. The measuring apparatus of claim 1, further comprising first and second capacitor plates positioned parallel to and spaced away from said first and second surfaces of said layer of epitaxial material.

34. The measuring apparatus of claim 33, wherein each of said first an d second capacitor plates comprise electrodes disposed on insulating surfaces.

35. The measuring apparatus of claim 34, wherein each of said first and second capacitor plates further comprise edge portions extending toward and contacting respective ones of said first and second surfaces of said layer of epitaxial material, whereby said electrodes are positioned parallel to and spaced away from respective ones of said first and second surfaces of said layer of epitaxial material.

36. The measuring apparatus of claim 35, wherein each of said first and second accelerometers comprise capacitive force rebalance accelerometers.

37. The measuring apparatus of claim 36, further comprising a force-rebalance circuit coupled to said first and second accelerometers for balancing applied acceleration forces to restore each of said proof masses to neutral position between said first and second capacitor plates.

38. The measuring apparatus of claim 37, wherein said force-rebalance circuit further comprises an alignment signal summed into a feed-back signal to each said first and second accelerometer.

39. The measuring apparatus of claim 38, wherein said alignment signal is subtracted from said output signals.

40. The measuring apparatus of claim 8, wherein each said proof mass is formed with a plurality of air passages.

41. The measuring apparatus of claim 8, wherein said link is formed with a plurality of air passages.

42. The measuring apparatus of claim 8, wherein each of said supports comprises a pivot flexure mounted to a support member formed in said frame, said support members formed with a plurality of air passages.

43. Apparatus for measuring the specific force and angular rotation rate of a moving body, the apparatus comprising:
a) a layer of epitaxial material having first and second opposing substantially planar surfaces disposed substantially parallel to each other;
b) a frame formed of said layer of epitaxial material, said frame having first and third opposing inner peripheral edges disposed substantially parallel to one another, a vibration axis disposed substantially parallel to said first and third opposing inner peripheral edges, and a rate axis disposed substantially parallel to said first and second opposing planar surfaces and substantially perpendicular to said vibration axis;
c) first and second substantially planar electrodes, one of said electrodes disposed substantially parallel to and spaced a predetermined distance away from each of said first and second planar surfaces of said layer of epitaxial material;
d) a first accelerometer formed of said first and second electrodes and a first proof mass formed of said layer of epitaxial material and pivotally suspended from said first innerperipheral edge of said frame by a first pair of flexures for motion along each of said vibration axis and a first force sensing axis, said first force sensing axis perpendicular to said first and second surfaces and said vibration axis for producing a first output signal indicative of the acceleration of the moving body along said first force sensing axis;
e) a second accelerometer formed of said first and second electrodes and a second proof mass formed of said layer of epitaxial material and pivotally suspended from said third innerperipheral edge of said frame by a second pair of flexures for motion along each of said vibration axis and a second force sensing axis, said second force sensing axis perpendicular to said first and second surfaces and said vibration axis for producing a second output signal indicative of the acceleration of the moving body along said second force sensing axis;
f) a magnetic circuit generating a magnetic flux, said magnetic circuit disposed such that said magnetic flux intersects said first and second accelerometers;
f) a conductive path deposited on at least one of each of said first and second pairs of flexures; and
g) an electrical circuit coupled to said conductive path and generating a drive signal therein, said drive signal interacting with said magnetic flux to impart a dithering motion to each of said first and second accelerometers having a predetermined frequency along said vibration axis, whereby said first and second output signals have a Coriolis component indicative of the angular rotation of the moving body about said rate axis.

44. The measuring apparatus of claim 43, wherein said first force sensing axis extends in a direction opposite to that of said second force sensing axis.

45. The measuring apparatus of claim 44, wherein said first and second pairs of flexures each comprise two or more legs.

46. The measuring apparatus of claim 44, further comprising a link having first and second points connected respectively to said first and second accelerometers, said first and second connected points disposed on respectively on a portion of said first and second proof masses opposite said flexures, a pivot point disposed between said first and second connected points, and one or more supports affixedly disposing said pivot point with respect to said frame to permit said link means to pivot thereabout and, when one of said first and second accelerometers is moved, to impart a substantially equal and opposite motion to said other of said first and second accelerometers.

47. The measuring apparatus of claim 46, wherein each of said first and second pairs of flexures exhibits an S-bend motion, whereby each said proof mass moves substantially parallel with respect to said first and third inner peripheral edges of said frame.

48. The measuring apparatus of claim 47, wherein said conductive path forms a first conductive path and said electrical circuit includes a signal processor for processing a pick-off signal; and further comprising:

a second conductive path disposed on at least one of said first and second surfaces of said layer of epitaxial material to traverse said first and second accelerometers, said second conductive path coupled to said electrical circuit and intersected by said magnetic flux, whereby said magnetic flux generates a pick-off signal in said second conductive path representative of the vibration of said first and second accelerometers along said vibration axis.

49. A method for measuring the specific force and angular rotation rate of a moving body, the method comprising:

forming a frame of a layer of epitaxial material having first and second substantially planar surfaces disposed substantially parallel to each other, said frame formed with a vibration axis disposed substantially parallel to said first and second surfaces and a rate axis perpendicular to said vibration axis;

forming a first accelerometer of said layer of epitaxial material, said first accelerometer formed with a first force sensing axis perpendicular to each of said vibration axis and said rate axis for producing a first output signal indicative of the acceleration of the moving body along said first force sensing axis, said first accelerometer formed with a proof mass and at least one flexure connecting said proof mass to said frame such that said proof mass can be moved along each of said first force sensing axis and said vibration axis;

forming a second accelerometer of said layer of epitaxial material, said second accelerometer formed with a second force sensing axis perpendicular to each of said vibration axis and said rate axis for producing a second output signal indicative of the acceleration of the moving body along said second force sensing axis, said second accelerometer formed with a proof mass and at least one flexure connecting said proof mass to said frame such that said proof mass can be moved along each of said second force sensing axis and said vibration axis; and imparting a dithering motion to each of said first and second accelerometers of a predetermined frequency along said vibration axis, whereby said first and second output signals have a Coriolis component indicative of the angular rotation of the moving body about said rate axis.

50. The method of claim 49, wherein each of said first and second accelerometers is coupled to an electrical circuit for imparting said dithering motion.

51. The method of claim 50, further comprising forming a link of said layer of epitaxial material, said link formed with first and second points connected respectively to said first and second accelerometers, disposing a pivot point between said first and second connected points, and supporting said pivot point with respect to said frame, whereby said link may pivot thereabout said pivot point and, when one of said first and second accelerometers is moved, impart a substantially equal and opposite motion to the other of said first and second accelerometers.

52. The measuring apparatus of claim 51, wherein said pivot point is disposed intermediate between said first and second connected points.

53. A method for measuring the specific force and angular rotation rate of a moving body, the method comprising:

forming a frame of a layer of epitaxial material having first and second opposing substantially planar surfaces disposed substantially parallel to each other, said frame having first and third opposing inner peripheral edges disposed substantially parallel to one another, a vibration axis disposed substantially parallel to said first and third opposing inner peripheral edges, and a rate axis disposed substantially parallel to said first and second planar surfaces and substantially perpendicular to said vibration axis;

forming a first proof mass of said layer of epitaxial material and pivotally suspending said first proof mass from said first inner peripheral edge of said frame by a first pair of flexures for motion along each of said vibration axis and a first force sensing axis perpendicular to said first and second surfaces and said vibration axis;

forming a second proof mass of said layer of epitaxial material and pivotally suspended from said third inner peripheral edge of said frame by a second pair of flexures for motion along each of said vibration axis and a second force sensing axis perpendicular to said first and second surfaces and said vibration axis;

forming a link of said layer of epitaxial material, said link formed with first and second points connected respectively to said first and second proof mass, a pivot point disposed intermediate between said first and second connected points, and one or more supports affixedly disposing said pivot point with respect to said frame to permit said link to pivot thereabout and, when one of said first and second accelerometers is moved, to impart a substantially equal and opposite motion to said other of said first and second accelerometers;

forming first and second substantially planar electrodes, each of said electrodes disposed substantially parallel to and spaced a predetermined distance away from a respective one of said first and second planar surfaces of said layer of epitaxial material;

producing a first output signal indicative of the acceleration of the moving body along said first force sensing axis and a second output signal indicative of the acceleration of the moving body along said second force sensing axis;

generating a magnetic flux intersecting said first and second accelerometers; and depositing a conductive path on at least one of each of said first and second pairs of flexures and generating a drive signal therein interacting with said magnetic flux to impart a dithering motion to each of said first and second proof mass having a predetermined frequency along said vibration axis, whereby said first and second output signals have a Coriolis component indicative of the angular rotation of the moving body about said rate axis.

54. The method of claim 53, wherein said first and second output signals indicative of the acceleration of the moving body along said first and second force sensing axes are produced by detecting differential electrostatic forces between each said first and second proof mass and each said first and second electrodes.

* * * * *